United States Patent
Khalid et al.

(10) Patent No.: US 12,444,953 B2
(45) Date of Patent: Oct. 14, 2025

(54) ROBUST CONTROL FOR OPTIMIZED ISLANDED AND GRID-CONNECTED OPERATION OF SOLAR/WIND/BATTERY HYBRID ENERGY SYSTEMS

(71) Applicant: KING FAHD UNIVERSITY OF PETROLEUM AND MINERALS, Dhahran (SA)

(72) Inventors: Muhammad Khalid, Dhahran (SA); Muhammad Maaruf, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/598,052

(22) Filed: Mar. 7, 2024

(65) Prior Publication Data
US 2024/0348058 A1 Oct. 17, 2024

Related U.S. Application Data

(60) Provisional application No. 63/459,810, filed on Apr. 17, 2023.

(51) Int. Cl.
*H02J 3/46* (2006.01)
*F03D 9/00* (2016.01)
(Continued)

(52) U.S. Cl.
CPC ............... *H02J 3/46* (2013.01); *F03D 9/007* (2013.01); *H02J 3/16* (2013.01); *H02J 3/32* (2013.01);
(Continued)

(58) Field of Classification Search
CPC ........ H02J 3/46; H02J 3/16; H02J 3/32; H02J 2300/28; H02J 2300/26; F03D 9/007; F03D 9/00; F05B 2220/708; H02M 3/158
See application file for complete search history.

(56) References Cited

U.S. PATENT DOCUMENTS

2022/0200282 A1 6/2022 Alali et al.
2024/0039296 A1* 2/2024 Narla .................. H02J 4/00

FOREIGN PATENT DOCUMENTS

CN 104659804 B 3/2017

OTHER PUBLICATIONS

Benadli et al. ; Sliding Mode Control of Hybrid Renewable Energy System Operating in Grid Connected and Stand-Alone Mode ; Power Electronics and Drives, vol. 6(4) ; Aug. 11, 2021 ; 23 Pages.
(Continued)

*Primary Examiner* — Robert L Deberadinis
(74) *Attorney, Agent, or Firm* — Oblon, McClelland, Maier &Neustadt, L.L.P.

(57) ABSTRACT

Control system and method for integration and transition between standalone and grid-connected operations of a hybrid renewable microgrid system include a multiple-input multiple-output controller that manages a rotor-side and a grid-side converter, structured in a back-to-back configuration, alongside a DC-DC buck-boost converter. The system harnesses energy from a solar generation unit of interconnected photovoltaic panels and a wind generation unit linked to a permanent magnet synchronous generator. Both energy sources are efficiently coordinated through maximum power point tracking control. The solar unit is directly connected to a DC bus, which also interfaces with the grid-side converter. An energy storage unit is seamlessly integrated, providing power management and voltage regulation capabilities to maintain consistent power delivery and quality, even during fluctuations in renewable energy production.

20 Claims, 18 Drawing Sheets

(51) Int. Cl.
*H02J 3/16* (2006.01)
*H02J 3/32* (2006.01)
*H02M 3/158* (2006.01)

(52) U.S. Cl.
CPC ..... *H02M 3/1582* (2013.01); *F05B 2220/708* (2013.01); *H02J 2300/26* (2020.01); *H02J 2300/28* (2020.01)

(56) References Cited

OTHER PUBLICATIONS

Hashemi et al. ; Multi-input multi-output sliding-mode control of LCL-based grid-connected modified Y-source inverter for power conditioning of photovoltaic generation : International Journal of Automation and Control, vol. 17, No. 3 ; Apr. 28, 2023 ; 24 Pages.

Nagamuneeswaran et al. ; Sliding Mode Control Methodology for a Grid Connected PV-Diesel Micro Grid ; International Journal on Research Innovations in Engineering Science and Technology, vol. 5, Issue 8 ; Aug. 2021 ; 14 Pages.

\* cited by examiner

ROBUST CONTROL FOR OPTIMIZED ISLANDED AND GRID-CONNECTED OPERATION OF SOLAR/WIND/BATTERY HYBRID ENERGY SYSTEMS

CROSS-REFERENCE TO RELATED APPLICATIONS

The present application claims benefit of priority to U.S. Provisional Application No. 63/459,810, filed Apr. 17, 2023, which is incorporated herein by reference in its entirety.

STATEMENT OF PRIOR DISCLOSURE BY AN INVENTOR

Aspects of the present disclosure were described in "Robust Control for Optimized Islanded and Grid-Connected Operation of Solar/Wind/Battery Hybrid Energy," Muhammad Maaruf, Khalid Khan, Muhammad Khalid, Sustainability 2022, 14(9), 5673 which is incorporated herein by reference in its entirety.

BACKGROUND

Technical Field

The present disclosure is directed to a method and system for controlling power in renewable energy systems, and more specifically to the operation of hybrid renewable energy systems (HRES) that integrate solar, wind, and battery storage technologies.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Renewable energy sources (RES), such as solar PV, wind, hydro, and geothermal, have become increasingly important in the global energy mix due to environmental concerns and the rising demand for electricity. Among these, solar and wind energies are highlighted for their low cost, widespread availability, modularity, and technological advancements that facilitate their integration into the power grid. Recent developments in power electronics have further enabled flexible and cost-effective control and integration of RES into the electrical grid.

However, the large-scale integration of RES into the power grid is hindered by their intermittent nature and geographical dependency, which significantly impacts the reliability and power quality of the energy system. The variability in wind speeds, temperatures, and solar irradiance levels can lead to fluctuations in power generation, posing challenges for maintaining a stable and reliable power supply.

To address the intermittency issues associated with individual RESs, the concept of hybrid renewable energy systems (HRES) has been introduced. HRES combines two or more power generation technologies to enhance overall operational efficiency and optimize capital investments. For instance, combining solar PV and wind energy can provide a complementary power generation profile, where the variability of one source is offset by the stability of the other. This synergy increases the probability of continuous power supply, with solar panels producing more power during the day and wind turbines compensating during the night.

Moreover, an energy storage system (ESS) is often implemented for managing the excess or deficient power generated, enabling better control over the variability of RES and loads. The ESS can provide multiple services, including bulk energy storage, transmission infrastructure support, customer energy management, ancillary services, and support for off-grid operations.

Despite the advantages of HRES and ESS, there are significant challenges in designing systems that can operate efficiently in both standalone and grid-connected modes. The primary challenge lies in maximizing power extraction from RES while ensuring power quality standards are met, particularly in mitigating system uncertainties and maintaining stable voltage levels across the grid. Existing solutions are often restricted with the optimal integration and control of RES and ESS to address the intermittent nature of solar and wind energies effectively.

Existing technologies have focused on various strategies for integrating RES into power systems, including maximum power point tracking (MPPT) techniques for optimizing energy capture from solar and wind sources, and the development of advanced control strategies for ESS. However, these approaches frequently fall short of providing a comprehensive solution that can reliably manage the complexities of hybrid systems operating under variable conditions. Each of the aforementioned techniques suffers from one or more drawbacks hindering their adoption. For example, the techniques fall short of capabilities that enable harnessing maximum power from the RESs while maintaining acceptable power quality standards in terms of mitigating the impact of system uncertainties and maintaining acceptable voltage levels across the grid.

Accordingly, it is one object of the present disclosure to provide methods and systems for control and integration of HRES that can effectively address the intermittent nature of solar and wind energies, ensure high operational efficiency, and maintain power quality in both islanded and grid-connected modes. The present disclosure describes a robust control system that can dynamically manage the integration of solar, wind, and battery storage technologies, maximizing the utilization of RES while overcoming the challenges posed by their variability and ensuring the stability and reliability of the power supply.

SUMMARY

In an exemplary embodiment, a method to control a hybrid renewable microgrid system is disclosed. The hybrid renewable microgrid system includes a solar energy generation unit and an energy storage unit in direct connection to a DC bus, a DC-DC buck-boost converter connected to the energy storage unit, a wind energy generation unit coupled to a rotor-side converter, a grid-side converter coupled to the DC bus, and a microgrid load. A utility grid comprising a plurality of energy generation sources and one or more utility grid loads is electrically coupled to the hybrid renewable microgrid system.

The method includes performing a maximum power point tracking control for each of the solar energy generation unit and the wind energy generation unit, receiving power from the wind energy generation unit utilizing the rotor-side converter and receiving power from the solar energy generation unit utilizing the grid-side converter, supplying at least one of (1) a first power to the microgrid load of the hybrid renewable microgrid system in a standalone operation of the hybrid renewable microgrid system and (2) a second power to a combination of the microgrid load of the hybrid renewable microgrid system and the one or more utility grid loads of the utility grid in a grid-connected operation of the hybrid renewable microgrid system, receiving a third power from the plurality of energy generation sources of the utility grid utilizing the rotor-side converter in the grid-connected operation of the hybrid renewable microgrid system, performing a sliding mode control for at least one of transition from the standalone operation to the grid-connected operation and a transition from the grid-connected operation to the standalone operation, controlling the supply of the second power in the grid-connected operation by integrating the wind energy generation unit into the utility grid through the rotor-side converter and the grid-side converter, regulating a microgrid load voltage of the microgrid load in the grid-connected operation of receiving the third power using a charging and/or discharging of the energy storage unit, controlling the charging and/or discharging of the energy storage unit using the DC-DC buck-boost converter in the standalone operation and the grid-connected operation of the hybrid renewable microgrid system, and regulating the microgrid load voltage through performing the maximum power point tracking control, the sliding mode control, and the charging and discharging of the energy storage unit in the standalone operation and the grid-connected operation of the hybrid renewable microgrid system.

In one aspect of the embodiment, the method includes charging the energy storage unit using the DC-DC buck-boost converter, wherein at least one of the sum value of power received from the solar energy generation unit and the power received from the wind energy generation unit greater than at least one of the first power and the second power, and a sum value of power received from the solar energy generation unit, the power received from the wind energy generation unit, and the power received from the plurality of energy generation sources of the utility grid greater than at least one of the first power and the second power.

In one aspect of the embodiment, the method includes discharging the energy storage unit using the DC-DC buck-boost converter. At least one of a sum value of power received from the solar energy generation unit and the power received from the wind energy generation unit lower than at least one of the first power and the second power, and a sum value of power received from the solar energy generation unit, the power received from the wind energy generation unit, and the power received from the plurality of energy generation sources of the utility grid lower than at least one of the first power and the second power.

In one aspect of the embodiment, the method includes converting an AC signal output of the wind energy generation unit to a DC signal using the rotor-side converter.

In one aspect of the embodiment, the method includes converting a plurality of DC signal outputs from the DC bus to a plurality of three-phase AC signals for supplying at least one of the first power and the second power using the grid-side converter.

In one aspect of the embodiment, the method includes converting a plurality of AC signals of the third power to a plurality of DC signals using the grid-side converter.

In one aspect of the embodiment, the method includes utilizing a diode connected in series and downstream to the solar energy generation unit for absorbing a reverse current from the DC bus.

In one aspect of the embodiment, the method includes stabilizing a DC voltage of the DC-bus through performing the maximum power point tracking control, the sliding mode control, and the charging and discharging of the energy storage unit.

In one aspect of the embodiment, the method includes triggering the sliding mode control through at least one of an ON state and an OFF state of a switch connected between the microgrid load of the hybrid renewable microgrid system and the utility grid.

In one aspect of the embodiment, the method includes connecting the rotor-side converter and the grid-side converter in a back-to-back converter configuration.

In another exemplary embodiment, a power system is disclosed. The power system includes a hybrid renewable microgrid system. The hybrid renewable microgrid system includes a multiple-input multiple-output controller including a rotor-side converter and a grid-side converter arranged in a back-to-back converter configuration, and a DC-DC buck-boost converter.

The hybrid renewable microgrid system further includes a solar energy generation unit including one or more photovoltaic panels connected in series and parallel and a wind energy generation unit including a wind turbine coupled to a permanent magnet synchronous generator. The permanent magnet synchronous generator is coupled to the rotor-side converter. The hybrid renewable microgrid system further includes a DC bus. The solar energy generation unit is in direct connection to the DC bus. The DC bus is connected to the grid-side converter.

The hybrid renewable microgrid system further includes an energy storage unit integrated to the DC-DC buck-boost converter and connected to the DC bus, a microgrid load coupled to the grid-side converter, and a utility grid. The utility grid includes a plurality of energy generation sources, and one or more utility grid loads.

In one aspect, the multiple-input multiple-output controller is configured to perform a maximum power point tracking control to receive power from the solar energy generation unit and the wind energy generation unit;

In one aspect, the multiple-input multiple-output controller is configured to perform a sliding mode control for a transition between a standalone operation and a grid-connected operation of the hybrid renewable microgrid system;

In one aspect, the hybrid renewable microgrid system is electrically disconnected from the utility grid in the standalone operation;

In one aspect, the hybrid renewable microgrid system is configured to perform at least one of supplying a power to the one or more utility loads of the utility grid and receiving a power from the plurality of energy generation sources of the utility grid in the grid-connected operation; and In one aspect, the multiple-input multiple-output controller is configured to regulate a microgrid load voltage of the microgrid load and a DC voltage of the DC bus.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
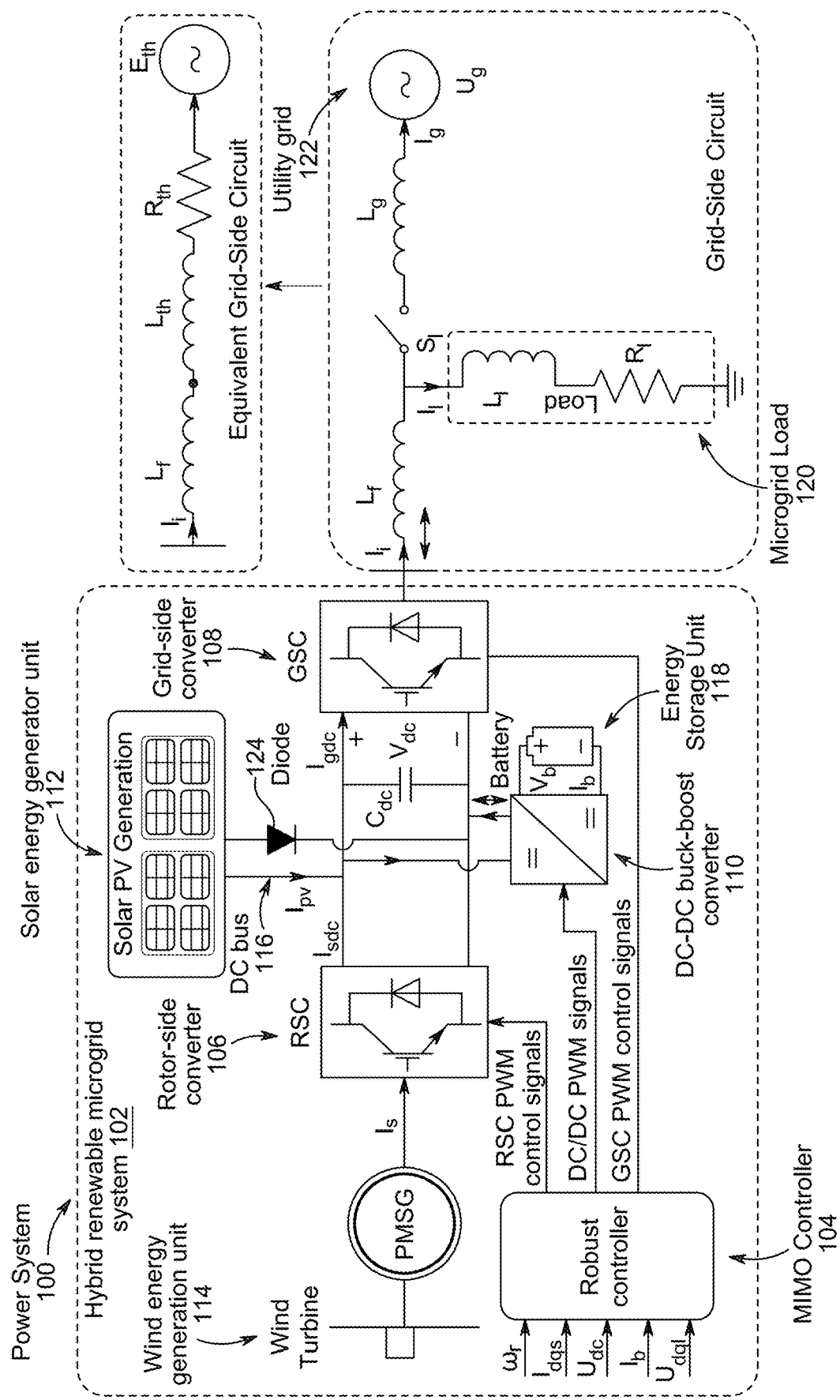
FIG. 1 illustrates a schematic of a power system, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a system and method of control for a hybrid renewable microgrid system. The Hybrid Renewable Energy System (HRES) includes wind electrical energy generation, solar electrical energy generation, and battery storage. The present disclosure relates to a non-linear, multi-input-multi-output (MIMO) robust sliding mode control (SMC) that enables the microgrid to operate effectively, whether in a standalone mode or when connected to a grid. The control system introduces a single unified controller that manages the operations safely and reliably, without requiring additional components like an islanding detection system. The various aspects of the present disclosure provide cost savings and operational efficiency because the photovoltaic (PV) array connects directly to the DC-bus, eliminating the need for an interfacing DC-DC boost converter and reducing potential power losses.

The control system mainly includes a controller that ensures compliant and efficient operation of HRES components under different modes, a DC-DC buck/boost integrated energy storage system to manage power flow during charging and discharging, and a back-to-back converter topology for the interconnection of wind and PV resources that optimizes efficiency. In one aspect, an autonomous Maximum Power Point Tracking (MPPT) operation for solar and wind sources, works with the rotor side and grid side converter configuration of the B2B converter. The control system aims to stabilize DC-bus and load voltages, achieve optimal power point tracking from solar and wind, and maintain power balance in both on-grid and off-grid scenarios.

FIG. 1 illustrates a schematic of a power system, in accordance with one embodiment. The power system, also known as an electrical grid or an electricity grid, is a network of synchronized power providers and consumers that are connected by transmission and distribution lines and operated by control centres. It facilitates the generation, transmission, and distribution of electrical power to consumers. The power system includes power plants, electrical substations, transformers, transmission lines, and distribution lines, all working together to ensure a reliable supply of electricity to homes, businesses, and industries.

The power system (100) includes a hybrid renewable microgrid system (102) and a utility grid (122). The hybrid renewable microgrid system (102) is an interconnected network of renewable and conventional energy sources, managed by control systems to ensure optimal energy utilization and storage. The hybrid renewable microgrid system (102) can operate independently from the main utility grid or be integrated to provide backup during grid instability or curtailments.

The selection of energy sources of hybrid renewable microgrid system (102) is based on the availability of various renewable resources at the specific location, such as solar radiation, wind speed, geothermal, or hydropower. The renewable sources are typically designed to produce surplus electricity during peak demand periods, allowing a portion of this energy to be stored for use when renewable energy is intermittent, such as solar energy at night or during wind lulls. The hybrid microgrid includes an Energy Storage System (ESS) to store excessive grid electricity generated to use during grid curtailments or instability.

Referring back to FIG. 1, the hybrid renewable microgrid system (102) includes, but may not be limited to, a solar energy generation unit (112) and a wind energy generation unit (114), in one embodiment. The solar energy generation unit (112) includes one or more photovoltaic panels connected in series and parallel, providing a versatile configuration for solar power generation. The photovoltaic panels are in direct connection to a DC bus (116) configured for the distribution of direct current within the microgrid system. In one aspect, a diode is connected in series to the solar energy generation unit (112) to avert destruction as a result of reverse flow of current.

The wind energy generation unit (114) includes a wind turbine that captures the wind's kinetic energy. The mechanical energy generated by the rotation of the wind turbine's blades is transferred to a Permanent Magnet Synchronous Generator (PMSG). The PMSG is a type of electrical generator that utilizes permanent magnets embedded within or attached to the surface of the rotor to create a constant magnetic field. The relative motion between this magnetic field and the stator winding induces an alternating current (AC) in the stator windings of the generator.

The PMSG is interfaced with the multiple-input multiple-output controller (104) of the hybrid renewable microgrid system (102), also referred as to MIMO (104) hereinafter. The MIMO (104) is configured to optimize the operation of the hybrid renewable microgrid system (102). In one implementation, the MIMO (104) is interfaced with both the solar energy generation unit (112) and the wind energy generation unit (114), managing their respective outputs to ensure maximum efficiency in power production.

According to one aspect, the MIMO (104) is provided with a power circuitry to perform maximum power point tracking (MPPT) of the wind energy generation unit and the solar energy generation unit. MPPT is a technique used to extract the maximum possible power from renewable energy sources, such as photovoltaic panels and wind turbines. Extraction of power is achieved by dynamically adjusting the electrical operating point of the modules or arrays. In an example of the solar energy generation unit (112), the MPPT control adjusts the connection of the photovoltaic panels to ensure the panels are operating at their peak power output given the current environmental conditions, such as sunlight intensity and temperature. For the wind energy generation unit (114), the MPPT control manipulates the load presented to the wind turbine by the permanent magnet synchronous generator coupled to the rotor-side converter (106) to optimize the turbine's rotational speed and torque for maximum energy capture from the wind.

Furthermore, the MIMO (104) is configured with a sliding mode control. The sliding mode control is a technique that changes the dynamics of a nonlinear system by applying a high frequency switching control. The sliding mode control is implemented for managing the transition between standalone and grid-connected operations of the hybrid renewable microgrid system (102). During standalone operation, the MIMO (104) ensures that the microgrid system (102) is electrically isolated from the utility grid (122) and maintains stable operation while supplying power solely to the microgrid load (120). Conversely, in grid-connected operation, the MIMO (104) manages the interaction between the microgrid system (102) and the utility grid (122), enabling the system to either supply power to utility grid loads or receive power from the utility grid's energy generation sources.

In accordance with the embodiment, the MIMO (104) includes a rotor-side converter (106) and a grid-side converter (108) arranged in a back-to-back converter configuration. According to the configuration, PMSG is interfaced with the MIMO (104) through the rotor-side converter (106). The rotor-side converter (106) is configured for processing the electrical output from the wind energy generation unit (114). The PMSG associated with the wind turbine of the wind energy generation unit (114) generates an alternating current (AC) with a frequency that varies depending on the rotational speed of the wind turbine. The rotor-side converter (106) converts this variable frequency AC into a direct current (DC), suitable for either immediate use by DC loads, storage in the energy storage unit (118), or further conversion for compatibility with AC loads or the utility grid (122). In one aspect, the rotor-side converter (106) is configured to convert an AC signal output of the wind energy generation unit to a DC signal.

The conversion process renders efficient utilization of the generated wind energy, irrespective of the variations in wind speed. The conversion process, in one implementation, includes rectifying the AC to DC and may also involve controlling the magnitude of the voltage to optimize the power output, which is a function facilitated by the MPPT control performed by the MIMO (104).

According to the embodiment, the grid-side converter (108) is configured to interconnect the solar energy generation unit and the wind energy generation unit. The grid-side converter (108) is implemented for converting the DC from the DC bus (116) into a plurality of three-phase AC signals and a plurality of three-phase AC signals to a plurality of DC signals. The AC is then supplied to the microgrid load (120) with electricity or for exporting excess power to the utility grid (122). The grid-side converter (108) is configured to synchronise the converted AC with the specific parameters of the utility grid (122), including voltage, frequency, and phase. The synchronization ensures that the transition between the hybrid renewable microgrid system (102) standalone operation and grid-connected operation does not adversely affect the utility grid (122) or the loads it supports.

In one embodiment, the MIMO (104) further includes a Pulse Width Modulation (PWM) generator is configured to generate a plurality of pulse width modulation signals as input to the grid-side converter. The PWM generator is configured for producing a series of PWM signals, which are used as inputs to the grid-side converter (108). PWM signals are utilized for controlling the converter's operation, including the modulation of voltage and frequency of the output power to match the requirements of the microgrid load (120) or to synchronize with the utility grid (122) during grid-connected operation.

According to the embodiment, the MIMO (104) includes a DC-DC buck-boost converter (110), configured to work in conjunction with the energy storage unit (118) to manage the storage and discharge of energy, contributing to the regulation of the DC bus voltage and providing a buffer against the intermittent nature of the renewable energy sources. The DC-DC buck-boost converter (110) facilitates the regulation of the DC bus (116) voltage. Such regulation is performed as the energy production from renewable sources, such as the solar energy generation unit (112) and the wind energy generation unit (114), can be highly variable, leading to fluctuations in the voltage level on the DC bus (116). The DC-DC buck-boost converter (110) compensates for such fluctuations by either stepping up the voltage when the energy generated is lower than the demand or stepping down the voltage when there is excess energy.

The DC-DC buck-boost converter (110) is a type of power converter that combines the functionalities of both buck converters (which step-down voltage) and boost converters (which step-up voltage), allowing the adjustment of the DC voltage to either a higher or lower level than the input voltage, depending on the requirements of the system at any given moment. By rapidly switching the flow of current and using the ESS, the DC-DC buck-boost converter (110) can transition between buck and boost modes. The MIMO (104) manages the switching control.

According to the embodiment, the hybrid renewable microgrid system (102) further includes an energy storage unit (118), connected to the DC bus (116) through the DC-DC buck-boost converter (110). The energy storage unit (118) serves as a repository for electrical energy, which can be utilized to store the electrical energy when production from the solar energy generation unit (112) and the wind energy generation unit (114) exceeds the consumption of the microgrid load (120), and supply the stored electrical energy to the grid during periods when the generation is insufficient or demand is higher. The electrical energy can be stored in various forms, such as chemical energy in batteries, kinetic energy in flywheels, or potential energy in pumped hydro storage systems. In one implementation of the embodiment, the energy storage unit (118) is a battery bank. The battery bank may include various battery technologies, such as lead-acid, lithium-ion, flow batteries and the like.

The integration of the energy storage unit (118) through the DC-DC buck-boost converter (110) is provisioned to adjust the voltage level to match the charging and discharging requirements of the energy storage unit (118), ensuring that the energy is stored efficiently and is available to be dispatched when required. In one aspect, the MIMO (104) controls the operational cycle of the energy storage unit (118) by regulating the charge and discharge cycles. The regulation ensures that the DC bus (116) voltage levels are maintained within specified limits for safe and efficient system operation.

In one aspect, the DC-DC buck-boost converter (110) is configured to transfer power from the energy storage unit (118) to at least one of the wind energy generation units (114), the solar energy generation unit (112), and the utility grid (122) through the discharging of the energy storage unit (118).

In another aspect, the DC-DC buck-boost converter (110) is configured to transfer power from the energy storage unit (118) to at least one of the wind energy generation units (114), the solar energy generation unit (112), and the utility grid (122) through the charging of the energy storage unit (118).

The DC bus (116) is configured for the distribution and management of direct current (DC) throughout the hybrid renewable microgrid system (102). In one implementation, the DC bus (116) is directly connected to the solar energy generation unit (112), The DC bus (116) acts as a collecting channel for this electricity, aggregating the power output from the solar panels before it is either utilized by the system, stored, or converted for other uses. The DC bus (116) is also connected to the grid-side converter (108) for the bidirectional flow of power between the microgrid system (102) and the utility grid (122).

According to the embodiment, the hybrid renewable microgrid system (102) further includes a microgrid load (120) coupled to the grid-side converter (108). The microgrid load (120) allows for the consumption of electricity within the microgrid system (102). the collective demand for electricity by all the end-use devices, appliances, and equipment that are connected to and powered by the hybrid renewable microgrid system (102). The microgrid load (120) can vary widely, encompassing a range of electrical devices from residential lighting and systems in industrial machinery and commercial infrastructure. The grid-side converter (108) supplies the AC power that to the microgrid load (120). The AC power must match the specific requirements of the microgrid load (120) in terms of voltage, frequency, and power quality. The MIMO (104) regulates the voltage supplied to the microgrid load (120) to ensure that, despite the variable nature of power generation from the solar energy generation unit (112) and the wind energy generation unit (114), the voltage remains within the range required for safe and efficient operation of the connected devices.

According to the embodiment, the power system (100) includes a utility grid (122). The utility grid (122) forms a broader electrical distribution network to which the hybrid renewable microgrid system (102) can connect. The utility grid (122) includes a plurality of energy generation sources, which can include traditional power plants, such as coal, natural gas, nuclear, and hydroelectric, as well as other renewable energy sources like large-scale solar and wind farms. The hybrid renewable microgrid system (102) is electrically disconnected from the utility grid (122) in the standalone operation. The hybrid renewable microgrid system (102) is also configured to perform at least one of supplying a power to the one or more utility loads of the utility grid and receiving a power from the plurality of energy generation sources of the utility grid in the grid-connected operation. In other words, the utility grid (122) serves as an ancillary power source and a potential recipient of excess power generated by the microgrid. When the microgrid system (102) operates in grid-connected mode, it can supply power to the utility grid (122) to support its loads, especially during peak demand times or when the microgrid's production exceeds its own consumption needs. Conversely, the microgrid can draw power from the utility grid (122) when its own generation is insufficient to meet the microgrid load (120), such as during periods of low wind or solar energy production.

Additionally, the utility grid (122) includes one or more utility grid loads. These loads represent the aggregate demand for electricity from all consumers connected to the utility grid, which can range from residential areas and commercial establishments to industrial facilities and public infrastructure. The utility grid (122) is configured to match the electricity generation in real-time with the demands of these widespread and varied loads, ensuring that all consumers receive a steady and stable supply of electricity.

In one embodiment, a switch S1 is configured to trigger a transition between a standalone operation and a grid-connected operation of the hybrid renewable microgrid system (102). The microgrid is connected to the utility grid through switch S1 that is placed between the microgrid load (120) and the utility grid (122). When the switch S1 is opened, the hybrid renewable microgrid system (102) operates in standalone mode and supplies to the load only. When the switch is closed, the system is in grid-connected mode. The switch S1 effectively controls the system's connectivity to the utility grid (122), allowing the microgrid to operate independently when isolated (standalone operation) and to exchange power with the utility grid when connected (grid-connected operation).

In one aspect of the embodiment, the mechanical power (Pw) captured by the wind turbine from the wind is given by:

$$P_w = \frac{1}{2}\rho \pi R^2 C_p(\lambda, \beta) V_w^3 \quad (1)$$

-continued $$C_p(\lambda, \beta) = 0.5176\left(\frac{116}{\lambda_i} - 0.4\beta - 5\right)e^{\frac{-21}{\lambda_i}} + 0.0068\lambda \quad (2)$$

$$\frac{1}{\lambda_i} = \frac{1}{\lambda + 0.08\beta} - \frac{0.035}{\beta^3 + 1} \quad (3)$$

$$\lambda = \frac{R\omega_r}{V_w} \quad (4)$$

$$\frac{d\omega_r}{dt} = J^{-1}P[T_m - T_e] \quad (5)$$

where, $V_w$ is the wind speed, $C_p$ is the power coefficient, $\rho$ is the air density, R is the radius of the wind turbine, $\omega_r$ is the angular speed of the wind turbine, the tip-speed ratio is represented by $\lambda$, $\beta$ is the pitch angle, J is the inertia of the mechanical shaft, $T_e$ and $T_m$ are the electrical and mechanical torque, respectively.

In another aspect of the embodiment, the AC signals from the wind generation system are converted to DC using to the rotor-side converter (106). The model of the PMSG is formulated in the d-q reference frame considering the dynamics of the RSC as follows:

$$V_{ds} = L_d \frac{dI_{ds}}{dt} - \omega_r L_q I_{qs} + R_s I_{ds}. \quad (6)$$

$$V_{qs} = L_q \frac{dI_{qs}}{dt} + \omega_r L_d I_{ds} + \omega_r \Lambda_r + R_s I_{qs}, \quad (7)$$

$$T_e = \frac{3P}{2}[(L_d - L_q)I_{ds}I_{qs} + \Lambda_r I_{qs}] \quad (8)$$

where, $V_{ds}$ is the d-axis stator voltage, $\Lambda r$ is the rotor flux, $R_s$ is the stator resistance, $V_{qs}$ is the q-axis stator voltage, $L_d$ is the d-axis self-inductance, $I_{ds}$ is the q-axis stator current, $I_{qs}$ is the q-axis stator current, $L_q$ is the q-axis self-inductance, and $R_s$ is the stator resistance. For nonsalient PMSG, $L_d = L_q$.

In yet another aspect of the embodiment, the series and parallel connected PV cells formulate the solar PV module that utilizes the solar radiation to generate the DC voltage. In this respect, the equivalent circuit of the PV cell comprises of a series resistor, parallel resistor, diode, and current source. The current output of the solar PV is expressed as:

$$I_{pv} = N_p\left(I_{ph} - I_s\left[\exp\left(\frac{qV_D}{N_s A K_B T}\right) - 1\right] - \frac{V_D}{R_{sh}}\right) \quad (9)$$

$$V_D = \frac{V_{pv} + I_{pv}\frac{N_s}{N_p}R_{se}}{N_s} \quad (10)$$

$$I_{ph} = [I_{sc} + \psi_i(T - T_r)]\frac{S}{1000} \quad (11)$$

$$I_s = I_{rs}\left(\frac{T}{T_r}\right)^3 \exp\left(\frac{qE_g}{AK_B T}\left[\frac{1}{T_r} - \frac{1}{T}\right]\right) \quad (12)$$

where, $I_{ph}$ is the photo-generated current, $I_{pv}$ is the PV output current, the leakage or reverse saturated current of the diode is denoted by $I_s$, $I_{rs}$ is the saturated current at the operating temperature of the PV module, $N_s$ and $N_p$ are the number of series and parallel connected PV cells, q is the electron charge, $V_D$ is the diode voltage, A is the p-n junction factor, Eg is the band gap energy of the semiconductor material used in the cell, KB represents the Boltzmann constant, $I_{sc}$ is short circuit current of the PV module, T is the ambient temperature, $\psi_i$ is the temperature coefficient, S is the solar irradiance level, Tr is the operating temperature of the PV module, $R_{se}$ and $R_{sh}$ are the equivalent series resistance and shunt resistance of the PV cell, respectively.

A number of PV modules are used to obtain a considerable power. The desired reference voltage of the DC-bus ($V^*_{dc}$) is obtained from the MPP voltage ($V^{max}_{pv}$) of the PV system. When the irradiance is not available, the $V^{max}_{pv}$ is replaced by the nominal value of the DC-bus voltage.

Figure 2:
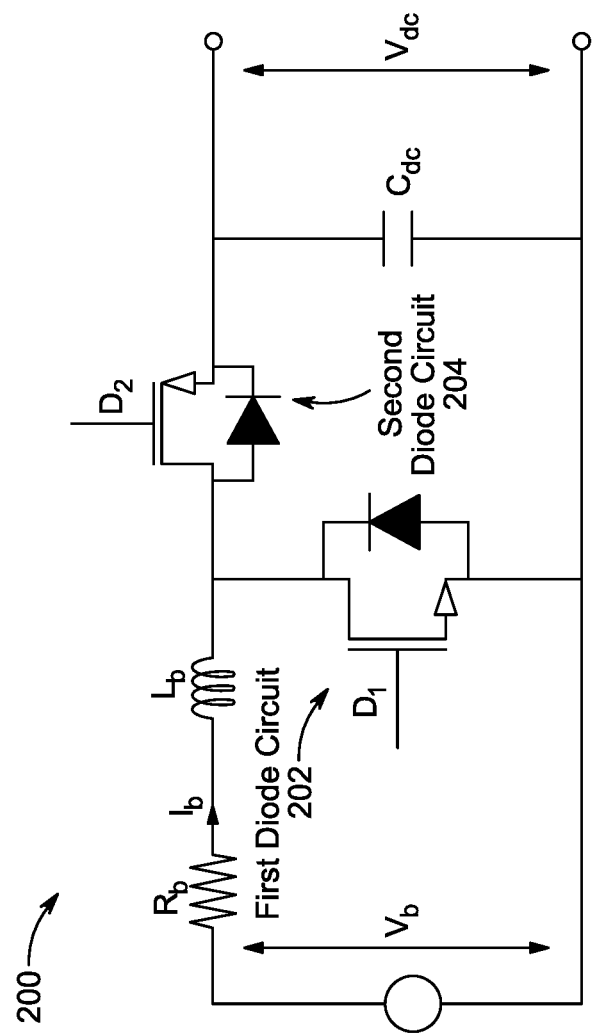
FIG. 2 illustrates a schematic diagram of a DC-DC buck-boost converter, according to certain embodiments.

FIG. 2 illustrates a schematic diagram of a DC-DC buck-boost converter, in accordance with one embodiment. In this schematic, $V_b$ represents the input voltage source, which could be derived from renewable energy sources such as a solar panel or wind turbine generator. The inductor $L_b$ and resistor $R_b$ model the inherent inductance and resistance of the circuit.

The switch $S_2$ (not shown in the figure) is typically a semiconductor device like a MOSFET or IGBT and is controlled by pulse width modulation signals generated by the MIMO (104) within the hybrid renewable microgrid system (102). The duty cycle of $S_2$ is varied to regulate the energy transferred to the output side of the circuit, thus controlling the output Vdc and maintaining it at the desired level regardless of input voltage variations or load changes on the DC bus (116).

In one implementation, Diode (D1) and Diode (D2) are connected to $S_2$. D1 (part of first diode circuit 202) allows current to flow when $S_2$ is open, preventing negative voltage at the inductor's right-hand side and thus providing a continuous path for inductor current. D1 enables the inductor to release its stored energy to the load and capacitor $C_{dc}$ when $S_2$ is not conducting.

The capacitor $C_{dc}$ serves to smooth out the output voltage $V_{dc}$ reducing voltage ripple and providing a stable DC output to the DC bus (116).

In the hybrid renewable microgrid system (102), the DC-DC buck-boost converter (110) facilitates the integration of the energy storage unit (118) with the DC bus (116), allowing energy from the solar energy generation unit (112) and the wind energy generation unit (114) to be stored or released as required to meet the demands of the microgrid load (120) or utility grid (122).

In one aspect, a lithium-ion (li-ion) battery is considered the energy storage unit (118). The DC-DC buck-boost converter (110) allows bi-directional operation of the energy storage unit (118), i.e., during the energy storage unit (118) charging, it operates as a buck converter and as a boost converter during the energy storage unit (118) discharging (13). Mathematically, the converter dynamics during the charging (buck) mode of the battery is formulated as:

$$B_{mode} = \begin{cases} 0, & \text{if } I_b < 0 \text{ (buck)} \\ 1, & \text{if } I_b > 0 \text{ (boost)} \end{cases} \quad (13)$$

$$L_b \frac{dI_b}{dt} = V_b - I_b R_b - (1 - D_1)V_{dc} \quad (14)$$

$$C_{dc}\frac{dV_{dc}}{dt} = (1 - D_1)I_b - I_{gdc} \quad (15)$$

where, $L_b$ is the battery inductance, $I_b$ is the battery current, $V_b$ is the battery voltage, $R_b$ is the internal resistance, $D_1$ is the generated control signal during the charging mode of the battery, $V_{dc}$ is the DC-bus voltage, $C_{dc}$ is the capacitance of the DC-bus, and $I_{gdc}$ is the DC current of the GSC converter. Similarly, converter dynamics during the discharging (boost) mode of the battery is expressed as:

$$L_b \frac{dI_b}{dt} = V_b - I_b R_b - D_2 V_{dc} \quad (16)$$

$$C_{dc} \frac{dV_{dc}}{dt} = D_2 I_b - I_{gdc} \quad (17)$$

where, $D_2$ is the generated control signal during the discharging mode of the battery. Accordingly, standardization can be made to reduce the complexity of the battery model to achieve general formulation using a virtual control (18). Hence, the overall generalized model of the of the battery model (14)-(17) is achieved, that is expressed as:

$$D_{12} = [B_{mode}(1-D_1) + (1-B_{mode})D_2] \quad (18)$$

$$L_b \frac{dI_b}{dt} = V_b - I_b R_b - D_{12} V_{dc} \quad (19)$$

$$C_{dc} \frac{dV_{dc}}{dt} = D_{12} I_b - I_{gdc} \quad (20)$$

$$\frac{d(SoC)}{dt} = -\frac{\eta_b}{Q_b} I_b \quad (21)$$

The state-of-charge (SoC) of the battery (21) is derived using the battery capacity ($Q_b$) and the battery efficiency ($\eta_b$). The SoC of the battery is constrained by the lower ($SoC^{min}$) and upper ($SoC^{max}$) limit of the battery capacity, as follows:

$$SoC^{min} < SoC < SoC^{max} \quad (22)$$

The solution of (21) is $$SoC(t) = SoC(0) - \frac{\eta_b \int I_b dt}{Q_b},$$

where SoC(0) is the initial charge of the battery. When the battery is charging, $I_b$ is negative, and the SoC(t) is increasing. On the other hand, when the battery is discharging, $I_b$ is positive, and SoC(t) is decreasing.

Figure 3:
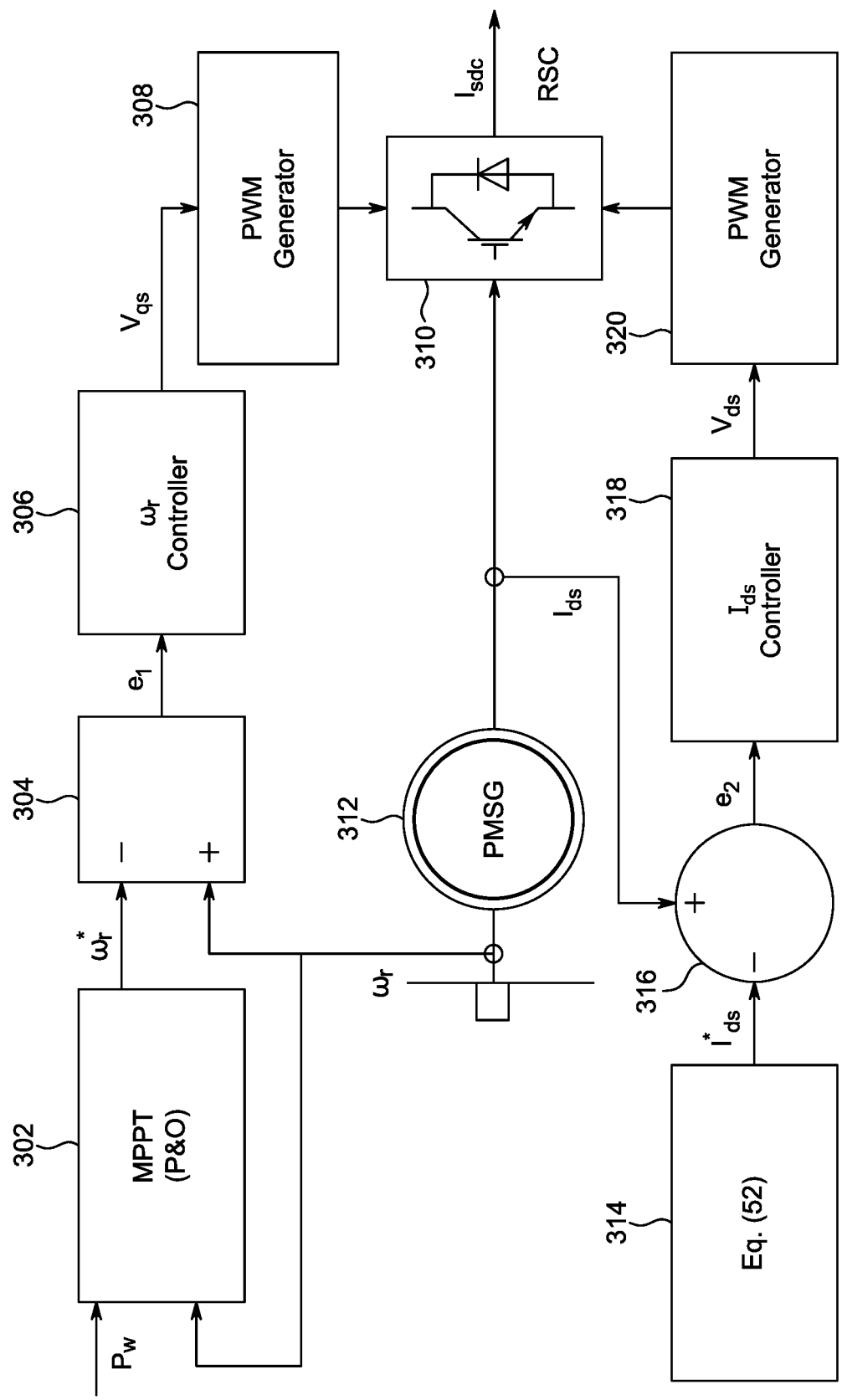
FIG. 3 illustrates a control system of the rotor-side converter, according to certain embodiments.

FIG. 3 illustrates a control system of the rotor-side converter, in accordance with one embodiment. The control system 300 is designed to control and provide maximum power point tracking (MPPT) performance for a wind turbine that is part of a hybrid renewable microgrid system, such as the one described in the power system claim.

The PMSG (312) is connected to the rotor-side converter (106), configured for converting the variable frequency and amplitude AC generated by the PMSG (312) to a DC current Iac, which can be utilized within the DC bus of the microgrid.

The MPPT (302), specifically the Perturb & Observe (P&O) technique used in the diagram, dynamically adjusts the operating point of the wind turbine to the maximum power point. The adjustment is based on the power Pw from the wind, and the control system continuously perturbs the operating point and observes the resulting change in power output to find and maintain operation at this maximum point.

The MPPT control feeds to a $\omega_r$ controller (306), configured as a control mechanism that adjusts the rotational speed of the PMSG (312) to match the desired reference speed for optimal power extraction. The adjustment of the rotational speed is indicated by the comparison between the actual rotational speed $\omega_r$ and the reference speed $\omega_{r*}$, with the error $e_1$ used to adjust the control signals to the rotor-side converter (310). $e_1$ is calculated at a comparative node 304.

The control system 300 further includes an $I_{ds}$ controller (318), which regulates the direct axis current component of the PMSG. The Ias controller (318) manages the power factor, with the objective of achieving unity power factor, where the phase difference between voltage and current is zero, indicating all the power is being used effectively with no reactive power. The error ez between the actual $I_{ds}$ and some reference value influences the control signals to the rotor-side converter (106) for this purpose. $e_2$ is calculated at a comparative node 316.

The control system 300 further includes a pulse width modulation (PWM) generator (320), which is configured to receive control signals from both the $\omega_r$ and $I_{ds}$ controllers (306, 318). The PWM generator (320) produces the gate signals for the power electronic switches within the rotor-side converter (106), modulating the power conversion process to ensure the PMSG operates at the desired points dictated by the MPPT and power factor control strategies.

Figure 4:
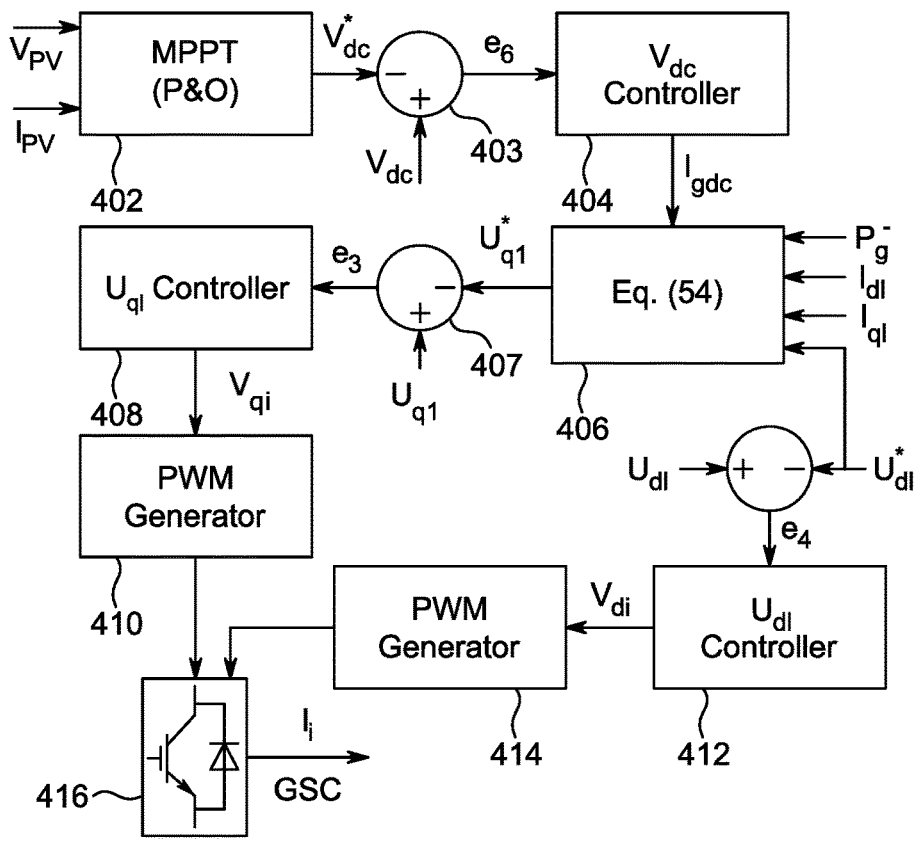
FIG. 4 illustrates the control scheme for a grid-side converter (GSC) within a hybrid renewable microgrid system, according to certain embodiments.

FIG. 4 illustrates the control scheme for a grid-side converter (GSC) within a hybrid renewable microgrid system, in accordance with one embodiment. The control system (400) depicts a cascaded control structure that is composed of two main loops, first, an outer DC-bus voltage control loop, and second, an inner current control loop.

The outer loop includes an MPPT (Maximum Power Point Tracking) block (402) utilizing the Perturb & Observe (P&O) technique. The MPPT controller (402) receives the photovoltaic voltage ($V_{PV}$) and current ($I_{PV}$) as inputs to determine the optimal operating point of the solar panels to maximize energy extraction. The output of the MPPT is a reference voltage (*$V_{dc}$*), which is compared with the actual DC bus voltage ($V_{dc}$) at a comparative node (403). The error signal ($e_6$) produced from comparative node (403) is processed by the DC voltage controller (404) to regulate the DC bus voltage by adjusting the current ($I_{gdc}$) flowing into the GSC.

The inner loop consists of a reactive power ($U_{ql}$) controller (408) and an active power ($U_{dl}$) controller (412). The $U_{ql}$ controller (408) is configured for managing the reactive power and, hence, the power factor of the system. It takes a reference reactive power value (*$U_{ql}$*) and the actual reactive power ($U_{ql}$), calculates the error signal ($e_3$), and outputs a command to the PWM generator (410). Similarly, the $U_{dl}$ controller adjusts the active power delivered by the GSC. It compares the reference (*$U_{dl}$*) and actual ($U_{dl}$) direct-axis voltages, generates an error signal ($e_4$), and sends a corresponding command to the PWM generator (414).

The PWM generators (410 and 414) produce the necessary pulse width modulation signals based on the inputs from their respective controllers. The PWM signals drive the GSC (416), which converts the DC from the solar panels to AC, suitable for supplying power to the microgrid load or for export to the utility grid. The GSC operates in synchronization with the grid's voltage and frequency.

The GSC is utilized to convert the DC signals to three-phase AC signals. Accordingly, GSC facilitates the power flow between the ESS and grid enabling the controllability over the load voltage, that is formulated in the d-q reference frame as:

$$V_{di} = U_{dl} - L_f \omega_g I_{qi} + L_f \frac{dI_{di}}{dt} \quad (23)$$

-continued $$V_{qi} = U_{ql} + L_f \omega_g I_{di} + L_f \frac{dI_{qi}}{dt} \quad (24)$$

where, $V_{di}$ and $V_{qi}$ denotes the d-axis and q-axis output voltage of the GSC, respectively, $L_f$ and $\omega_g$ are the line filter inductance and grid electrical angular speed, respectively, $U_{dl}$ and $U_{ql}$ are the d-axis and q-axis load voltages, respectively, $I_{di}$ and $U_{qi}$ are the d-axis and q-axis GSC ouput currents.

In one embodiment, the grid circuit consists of $L_f$, line inductance ($L_g$), RL load, switch ($S_1$), and the grid voltage. The leakage inductance of the transformer is included in $L_g$ to simplify the circuit. In order to obtain the expression of the load voltage in terms of the grid voltage, the grid-side circuit is converted to the Thevenin's equivalent.

If the load impedance ($Z_l$) and the grid voltage ($U_g$) are given by $Z_l = R_l + j\omega_g L_l$ and $U_g = U_{dg} + jU_{qg}$, respectively, then the Thevenin's impedance ($Z_{th}$) and voltage ($E_{th}$) are respectively expressed as:

$$Z_{th} = \frac{j\omega_g L_g (R_l + j\omega_g L_l)}{R_l + j\omega_g (L_g + L_l)} \quad (25)$$

$$E_{th} = \frac{(U_{dg} + jU_{qg})(R_l + j\omega_g L_l)}{R_l + j\omega_g (L_g + L_l)} \quad (26)$$

where, $U_{dg}$ and $U_{qg}$ are the d-axis and q-axis grid voltages $R_l$ is the load resistance, and $L_l$ is the load inductance. The $R_l$ and $L_l$ are calculated from the power supplied to the load as follows:

$$R_l = \frac{3}{2} \frac{U_{ll}^2 P_l}{P_l^2 + Q_l^2}; \quad L_l = \frac{3}{2\omega_g} \frac{U_{ll}^2 Q_l}{P_l^2 + Q_l^2} \quad (27)$$

where, $U_{ll}$ is the line-to-line root-mean-square voltage. The active power ($P_l$) and the reactive power ($Q_l$) of the load are computed using its relationship with the d-axis load voltage ($U_{dl}$) and current ($I_{dl}$) as well as the q-axis load voltage ($U_{ql}$) and current ($I_{ql}$), as:

$$P_l = \frac{3}{2}(U_{dl}I_{dl} + U_{ql}I_{ql}); \quad Q_l = \frac{3}{2}(U_{ql}I_{dl} - U_{dl}I_{ql}) \quad (28)$$

The following equations are the d-q-axis representation of the grid side load voltages.

$$U_{dl} = R_{th} I_{di} - \omega_g L_{th} I_{qi} + E_{thd} \quad (29)$$

$$U_{ql} = R_{th} I_{qi} + \omega_g L_{th} I_{di} + E_{thq} \quad (30)$$

where, $R_{th}$ represents the Thevenin's resistance, $L_{th}$ is the Thevenin's inductance, $E_{thd}$ and $E_{thq}$ are the Thevenin's voltage in the d-axis and q-axis, respectively.

When the hybrid microgrid is in standalone mode, $E_{th} = 0$ and $Z_{th} = Z_L$. A robust control law is essential to stabilize the load voltage when the hybrid microgrid is switching between the standalone mode and the grid-connected mode.

To design a controller that can operate in both standalone and grid-connected modes, the dynamic equations of the components of the hybrid microgrid are expressed in state-space form. The system to be controlled is described by (5)-(7), (19)-(21), (23), and (24). It is an eight-order non-linear MIMO system that has six control inputs and six controlled outputs. The state variables' vector, the inputs' vector, and the controlled outputs' vector are respectively defined as $x=[\omega_r, I_{ds}, U_{dl}, U_{ql}, I_b, V_{dc}, SOC]^T$, $V=[V_{qs}, V_{ds}, V_{di}, V_{qi}, D_{12}, I_{gdc}]^T$, and $y=h(x)=[\omega_r, I_{ds}, U_{dl}, U_{ql}, I_b, V_{dc}]^T$. The dynamic equations of the hybrid microgrid system can be transformed to state-space model as follows:

$$\dot{x} = f(x) + g(x)V \quad (31)$$

$$y = h(x)$$

where, $$f(x) = \begin{bmatrix} J^{-1}P[T_m - T_e] \\ [\omega_r L_q I_{qs} - R_s I_{ds}]/L_d \\ [-\omega_r L_d I_{ds} - \omega_r \Lambda_r - R_s I_{qs}]/L_q \\ U_{dl}/L_f - \omega_g I_{qi} \\ U_{ql}/L_f + \omega_g I_{di} \\ V_b/L_b \\ D_{12} I_b / C_{dc} \\ \eta_b/Q_b \end{bmatrix}$$

$$g(x) = \begin{bmatrix} 0 & 0 & 0 & 0 & 0 & 0 \\ \frac{1}{L_d} & 0 & 0 & 0 & 0 & 0 \\ 0 & \frac{1}{L_q} & 0 & 0 & 0 & 0 \\ 0 & 0 & \frac{1}{L_f} & 0 & 0 & 0 \\ 0 & 0 & 0 & \frac{1}{L_f} & 0 & 0 \\ 0 & 0 & 0 & 0 & -\frac{V_{dc}}{L_b} & 0 \\ 0 & 0 & 0 & 0 & 0 & -\frac{1}{C_{dc}} \\ 0 & 0 & 0 & 0 & 0 & 0 \end{bmatrix}$$

The input-output dynamics of the system is obtained by differentiating each output element of y with respect to time until at least one control input emerges. It is worth noting that $\omega_r$ has been differentiated twice before the input appears, while each of the remaining controlled outputs has been differentiated once. The input-output dynamics is thus:

$$\begin{bmatrix} \ddot{\omega}_r \\ \dot{I}_{ds} \\ \dot{U}_{dl} \\ \dot{U}_{ql} \\ \dot{I}_b \\ \dot{V}_{dc} \end{bmatrix} = \begin{bmatrix} F_1 \\ F_2 \\ F_3 \\ F_4 \\ F_5 \\ F_6 \end{bmatrix} + \begin{bmatrix} \frac{3P^2 \Lambda_r}{2JL_q} & 0 & 0 & 0 & 0 & 0 \\ 0 & \frac{1}{L_d} & 0 & 0 & 0 & 0 \\ 0 & 0 & \frac{R_{th}}{L_f} & -\frac{\omega_g L_{th}}{L_f} & 0 & 0 \\ 0 & 0 & \frac{\omega_g L_{th}}{L_f} & \frac{R_{th}}{L_f} & 0 & 0 \\ 0 & 0 & 0 & 0 & -\frac{V_{dc}}{L_b} & 0 \\ 0 & 0 & 0 & 0 & 0 & -\frac{1}{C_{dc}} \end{bmatrix} \quad (32)$$

-continued $$\begin{bmatrix} V_{qs} \\ V_{ds} \\ V_{dl} \\ V_{ql} \\ D_{12} \\ I_{gdc} \end{bmatrix} = F(x) + G(x)V.$$

$$\text{where, } F_1 = -\frac{\frac{3P^2 \Lambda_r}{2J}[\omega_r L_q I_{qs} - R_s I_{ds}]}{L_d} \tag{33}$$

$$F_2 = \frac{[-\omega_r L_d I_{ds} - \omega_r \Lambda_r - R_s I_{qs}]}{L_q} \tag{34}$$

$$F_3 = R_{th}\left(\omega_g I_{qi} - \frac{U_{dl}}{L_f}\right) - \omega_g L_{th}\left(-\omega_g I_{di} - \frac{U_{ql}}{L_f}\right) + \dot{E}_{th} \tag{35}$$

$$F_4 = R_{th}\left(-\omega_g I_{di} - \frac{U_{ql}}{L_f}\right) - \omega_g L_{th}\left(-\omega_g I_{qi} - \frac{U_{dl}}{L_f}\right) + \dot{E}_{thq} \tag{36}$$

$$F_5 = \frac{D_{12} V_b}{L_b} \tag{37}$$

$$F_6 = \frac{I_b}{C_{dc}} \tag{38}$$

The number of differentiations of each output is the relative degree of the output with respect to its input. Therefore, the total relative degree of (32) is 8.

Wind Turbine MPPT Configuration

A P & O scheme is employed for the MPPT operation of the wind turbine. The maximum power point of the wind turbine (Ppw) can be computed as follows:

$$\frac{dP_w}{d\omega_r} = 0.5\rho V_w^3 \frac{dC_p(\lambda, \beta)}{d\omega_r} = 0. \tag{39}$$

By setting $\beta=0$, $C_p$ becomes a function of $\lambda$ only. Therefore, $$\frac{dC_p(\lambda, 0)}{d\omega_r}$$

is obtained as:

$$\frac{dC_p}{d\omega_r} = \frac{dC_p}{d\lambda_i} \times \frac{d\lambda_i}{d\omega_r} \tag{40}$$

Equation (39) can be rewritten as:

$$\frac{dC_p}{d\omega_r} = 0.5\rho V_w^3 \left(\frac{1260}{\lambda_i^3} - \frac{114.39}{\lambda_i^2}\right) e^{\frac{-21}{\lambda_i}} \times \frac{V_w R}{(V_w - 0.035 R\omega_r)^2} \tag{41}$$

From (41), the condition for maximum power is $(V_w - 0.035R\omega_r) \neq 0$, then the optimal value of the power coefficient $(C_p^{max})$ and optimum tip speed ratio $(\lambda_{opt})$ are 0.48 and 8.1, respectively.

A P & O scheme is employed for the MPPT operation of the PV module. The output power from the PV module $(P_{pv})$ is expressed as:

$$P_{pv} = I_{pv} V_{pv} \tag{42}$$

At MPP:

$$\frac{dP_{pv}}{dV_{pv}} = I_{pv} + V_{pv}\frac{dI_{pv}}{dV_{pv}} = 0. \tag{43}$$

Figure 5:
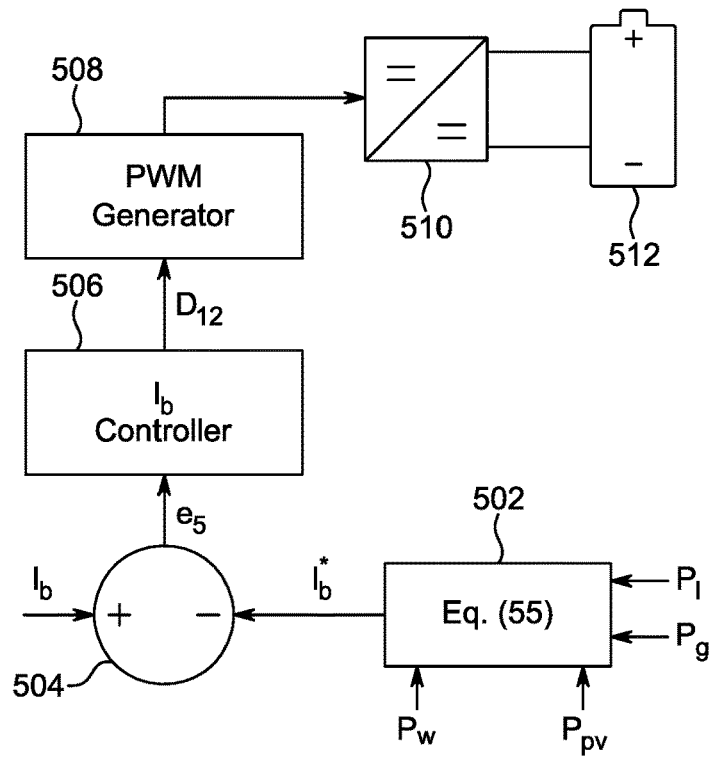
FIG. 5 depicts a schematic of a control system of the energy storage system (ESS) within the hybrid renewable microgrid system, according to certain embodiments.

Maximum power is extracted from the PV using the formulated MPP, that determines the corresponding DC-link voltage of the PVs. Similarly, the current enhanced centralized power converters enable direct integration of PVs ensuring power quality standard of operation. FIG. 5 depicts a schematic of a control system of the energy storage system (ESS) within the hybrid renewable microgrid system, in accordance with one embodiment. The control system 500 is configured for managing the charging and discharging operations of the energy storage unit (512), thereby ensuring balance within the power system (100).

Equation (55) (502) symbolizes the algorithm or set of rules that calculate the reference current ($*I_b*$) based on various parameters, such as the power generated by the wind ($P_w$) and solar photovoltaic ($P_{pv}$) units, as well as the power demanded by the grid ($P_g$) and the load ($P_l$).

A comparative node (504) performs the comparison operation that produces the error signal ($e_5$) from the difference between the reference current ($*I_b*$) and the actual current ($I_b$). The error signal $e_5$ is generated for the feedback loop that allows the system to respond to changes in the state of charge of the energy storage unit or shifts in the demand or supply within the microgrid.

The Ip Controller (506) is configured for monitoring and controlling the current ($I_b$) flowing to and from the energy storage unit (512). It compares the actual current ($I_b$) with a reference current ($*I_b*$), which is determined by the power balance requirements of the system. The difference between these currents is the error signal ($e_5$), which is used by the controller to adjust the PWM signals, effectively regulating the charging or discharging of the energy storage unit (512).

A Pulse Width Modulation (PWM) Generator (508) produces the control signals necessary to adjust the duty cycle of a buck/boost converter (510). The duty cycle determines the amount of time the converter's switch is closed during each switching cycle, which in turn regulates the voltage and current supplied to or drawn from the energy storage unit (512).

Thus, the control system 500 ensures that the ESS buck/boost converter (510) operates effectively to maintain a stable power supply, contributing to the system's ability to mitigate the variability inherent in renewable energy sources.

To prevent power shortage and damage of the microgrid components due to excess power, an energy management system is configured to coordinate the power flow between the grid power ($P_b$), $P_{pv}$, $P_w$, battery power ($P_b$), and the active load demand ($P_l$). The power balance equation for the hybrid microgrid is written as:

$$\text{Grid connected: } P_b + P_w + P_{pv} = P_l + P_g \tag{44}$$

$$\text{Stand alone: } P_b + P_w + P_{pv} = P_l \tag{45}$$

It is worth noting that $$P_g = \begin{cases} P_g^- < 0 \text{ when receiving power} \\ P_g^+ < 0 \text{ when ending power} \end{cases} \quad (46)$$

The net power in the system ($P_{net}$) can be computed as:

$$P_{net} = P_l + P_g - (P_w + P_{pv}) \quad (47)$$

The charging and discharging modes of the battery depend on $P_{net}$. When $P_{net}<0$, the excess power generated is transferred to the battery (charging mode) provided that $SoC<S_oC^{max}$. When $P_{net}>0$, the power shortage is compensated by discharging battery power to the load provided that $SoC>SoC^{min}$, otherwise load shedding is needed to maintain power balance.

In view of FIG. 1 to FIG. 5, the nonlinear MIMO robust control system for the hybrid microgrid system can be configured. The configured control system works satisfactorily even under changing solar irradiation and varying wind speed. The control objectives are outlined as follows: 1. Harnessing the maximum power from the wind by optimally regulating the rotor speed, $\omega_r$, to track the wind speed variations; 2. Achieving a unity power factor operation at the PMSG stator terminals by controlling $I_{ds}$; 3. MPPT operation of the PV module by controlling Vpv; 4. Meet the load voltage requirement by controlling the $U_{dl}$ and $U_{ql}$; 5. Ensuring a smooth power management between the renewable energy sources, storage system, load, and grid by controlling $I_b$; 6. Regulating the DC-bus voltage by controlling $V_{dc}$.

The reference variables for $\omega_r$, $I_{ds}$, $U_{dl}$, $U_{ql}$, $I_b$, and $V_{dc}$ are set as $\omega^*_r$, $I^*_{ds}$, $U^*_{dl}$, $U^*_{ql}$, $I^*_b$, and $V^*_{dc}$, respectively. The reference values are calculated as follows:

The $\omega^*_r$ is computed as follows:

$$\omega^*_r = \frac{\lambda_{opt} V_w}{R} \quad (48)$$

The $I^*_{ds}$ can be generated as follows: The stator's power factor angle ($\Theta_s$) must remain zero in order to obtain unity power factor. The PMSG's stator current angle ($\Theta_I$) and voltage phase angle ($\Theta_V$) are expressed by the following equations:

$$\Theta_I = \tan^{-1}\left(\frac{I_{qs}}{I_{ds}}\right) \quad (49)$$

$$\Theta_V = \tan^{-1}\left(\frac{V_{qs}}{V_{ds}}\right) = \tan^{-1}\frac{\omega_r \Lambda_r - \omega_r L_d I_{ds}}{\omega_r L_q I_{qs}} \quad (50)$$

Subsequently, $I^*_{ds}$ is computed such that the following condition is satisfied.

$$\Theta_s = \Theta_V - \Theta_I = 0. \quad (51)$$

The value of $I^*_{ds}$ is thus:

$$I^*_{ds} = \frac{\Lambda_r - \sqrt{\Lambda_r^2 - 4L_d L_q I_{qs}^2}}{2L_d} \quad (52)$$

$U^*_{dl}$ is selected to be equal to the grid voltage ($U^*_{dl}=|U_g|$) so that the grid can easily synchronize with the microgrid at the point of common coupling.

$U^*_{ql}$ is selected such that the reactive power is very close to zero. It is calculated as follows:

Assuming the GSC is ideal, then the active power along the two sides of the GSC are equal.

$$I_{gdc} V_{dc} = P_l + P_g^- = U^*_{dl} I_{dl} + U^*_{ql} I_{ql} + P_g^- \quad (53)$$

Note that $P_g^-$ is the power received by the grid from the GSC as explained in (46) and $I_{gdc}$ is the control input of $V_{dc}$.

From (53), $U^*_{ql}$ can be derived as follows:

$$U^*_{ql} = \frac{I_{gdc} V_{dc} - U^*_{dl} I_{dl} - P_g^-}{I_{ql}} \quad (54)$$

$I^*_b$ is calculated by dividing $P_{net}$ in (47) with $V_b$ as follows:

$$I^*_b = \frac{P_{net}}{V_b} \quad (55)$$

$V^*_{dc}$ is set as the MPPT voltage of the PV module ($V^*_{dc}=V_{pv}^{max}$). However, when the solar irradiance is low, $V^*_{dc}$ is set as the nominal voltage of the DC-bus. The nominal value of the DC-bus voltage is calculated as:

$$V^*_{dc} \geq \frac{1.6\sqrt{2} \, U_u}{\sqrt{3} \, m_i} \quad (56)$$

where $m_i$ is the modulation index.

The tracking errors are given as follows:

$$e_1 = \omega_r - \omega^*_r \quad (57)$$

$$e_2 = I_{ds} - I^*_{ds} \quad (58)$$

$$e_3 = U_{dl} - U^*_{dl} \quad (59)$$

$$e_4 = U_{ql} - U^*_{ql} \quad (60)$$

$$e_5 = I_b - I^*_b \quad (61)$$

$$e_6 = V_{dc} - V^*_{dc} \quad (62)$$

The sliding mode surfaces are defined as:

$$\begin{cases} \zeta_1 = \dot{e}_1 + k_1 \int e_1 dt + \gamma e_1 \\ \zeta_i = e_i + k_i \int e_i dt, \, i = 2, 3, 4, 5, 6 \end{cases} \quad (63)$$

where $k_i$, $\alpha_i(i=1,2,\ldots,6)$, and $\gamma$ are positive constants.

The time derivative of (63) yields:

$$\begin{cases} \dot{\zeta}_1 = \ddot{e}_1 + k_1 e_1 dt + \gamma \dot{e}_1 \\ \dot{\zeta}_i = \dot{e}_i + k_i e_i dt, \, i = 2, 3, 4, 5, 6 \end{cases} \quad (64)$$

Define the vector $\zeta=[\zeta_1, \zeta_2, \zeta_3, \zeta_4, \zeta_5, \zeta_6]^T$. Then, (64) can be evaluated as follows:

$$\dot{\zeta} = F + GV + \begin{bmatrix} -\dot{\omega}_r^* + k_1 e_1 + \gamma \dot{e}_1 \\ -\dot{I}_{ds}^* + k_2 e_2 \\ -\dot{U}_{dl}^* + k_3 e_3 \\ -\dot{U}_{ql}^* + k_4 e_4 \\ -\dot{I}_b^* + k_5 e_5 \\ -\dot{V}_{dc}^* + k_6 e_6 \end{bmatrix} \quad (65)$$

The output variables will converge toward their respective sliding mode surfaces and provide the desired steady-state performance by staying on the surfaces provided that $\zeta_i=\dot{\zeta}_i=0$ (i=1,2, . . . ,6). The equivalent control input vector ($V_{eqv}$) can be obtained by cancelling the terms on the right-hand side of (65).

$$V_{eqv} = -G^{-1}F - G^{-1} \begin{bmatrix} -\dot{\omega}_r^* + k_1 e_1 + \gamma \dot{e}_1 \\ -\dot{I}_{ds}^* + k_2 e_2 \\ -\dot{U}_{dl}^* + k_3 e_3 \\ -\dot{U}_{ql}^* + k_4 e_4 \\ -\dot{I}_b^* + k_5 e_5 \\ -\dot{V}_{dc}^* + k_6 e_6 \end{bmatrix} \quad (66)$$

Since $\det(G(x)) \neq 0$, (66) is well defined. In order to compensate the external disturbances and parametric uncertainties, a switching control input vector is given by:

$$V_{sw} = -G^{-1}\alpha \text{Sign}(\alpha). \quad (67)$$

where $\alpha = \text{diag}(\alpha_1, \alpha_2, \alpha_3, \alpha_4, \alpha_5, \alpha_6)$ is a positive definite diagonal matrix, and $\text{Sign}(\zeta) = [\text{sign}(\zeta_1), \text{sign}(\zeta_2), \text{sign}(\zeta_3), \text{sign}(\zeta_4), \text{sign}(\zeta_5), \text{sign}(\zeta_6)]^T$.

The robust control input vector is given by:

$$V = V_{eqv} + V_{sw} = V_{eqv} - G^{-1}\alpha \text{Sign}(\alpha) \quad (68)$$

Given the sliding mode surfaces (63) and the robust control inputs (68), the state trajectories of the hybrid microgrid system will asymptotically converge on the sliding mode surfaces.

Proof. Consider the following candidate Lyapunov function:

$$L = \frac{1}{2}\zeta^T\zeta. \quad (69)$$

The time derivative of L yields:

$$\dot{L} = \zeta^T\dot{\zeta} \quad (70)$$

By substituting (65) and (68) into (70), the following equation is obtained.

$$\dot{L} = -\zeta^T\alpha\text{Sign}(\zeta). \quad (71)$$

Taking the norm of (71) gives:

$$\dot{L} \leq -\|\alpha\| \cdot \|\zeta\|. \quad (72)$$

Therefore, the closed-loop system is asymptotically stable.

The control system can be configured by configuring one or more parameters of the renewable generation system, as shown in Table 1, grid and energy storage parameters are as shown in Table 2.

TABLE 1

Parameters of the renewable generation system

| Wind Turbine Generator | | | Solar PV Generator (KC200GH-2p) | | |
|---|---|---|---|---|---|
| Parameter | Symbol | Value | Parameter | Symbol | Value |
| Air density (kg/m³) | ρ | 12.5 | Ambient Temperature | T | 25 |
| Radius of wind turbine (m) | R | 28.2 | Maximum power at MPP (W) | $P_{max}^{MPP}$ | 200 |
| | | | Maximum power at MPP (W) | $V_{max}^{MPP}$ | 26.3 |
| D-axis stator current (mH) | $L_{ds}$ | 9.8 | P-N junction factor | A | 1.8 |
| | | | Temperature coefficient (mA/° C.) | $\psi_i$ | 4.79 |
| Q-axis stator current (mH) | $L_{qs}$ | 9.8 | Equivalent shunt resistor (Ω) | $R_{sh}$ | 313.33 |
| Rotor flux (Wb) | $\Lambda_r$ | 28 | Equivalent series resistor (Ω) | $R_{se}$ | 0.193 |
| Inertia of mechanical shaft (Kg · m²) | J | 4000 | Short circuit current (A) | $I_{SC}$ | 8.21 |
| | | | Maximum current at MPP (A) | $I_{max}^{MPP}$ | 7.61 |
| Number of pole pairs | P | 8 | Number of parallel modules | $N_S$ | 68 |
| Optimum tip speed ratio | $\lambda_{opt}$ | 8.1 | Number of series modules | $N_p$ | 95 |
| Power coefficient | $C_p^{max}$ | 0.48 | Open-circuit voltage (V) | $V_{oc}$ | 32.9 |

TABLE 2

Grid and energy storage parameters

| Battery Energy Storage System | | | Grid Parameter | | |
|---|---|---|---|---|---|
| Parameter | Symbol | Value | Parameter | Symbol | Value |
| Battery efficiency | $\eta_b$ | 0.9 | Filter inductance (mH) | $L_f$ | 16.9 |
| Battery capacity (AH) | $Q_b$ | 100 | Line inductance (mH) | $L_g$ | 1.69 |
| Battery power (MW) | $P_b$ | 1 | Load demand (MW) | $P_l$ | 2 |
| Battery voltage (V) | $V_b$ | 500 | Line-to-line voltage (V) | $U_{ll}$ | 4000 |

TABLE 2-continued

Grid and energy storage parameters

| Battery Energy Storage System | | | Grid Parameter | | |
|---|---|---|---|---|---|
| Parameter | Symbol | Value | Parameter | Symbol | Value |
| Upper SoC limit (%) | $SoC^{max}$ | 90 | DC-bus capacitance (µF) | $C_{dc}$ | 1670 |
| Lower SoC limit (%) | $S_oC^{min}$ | 10 | | | |

Figure 6:
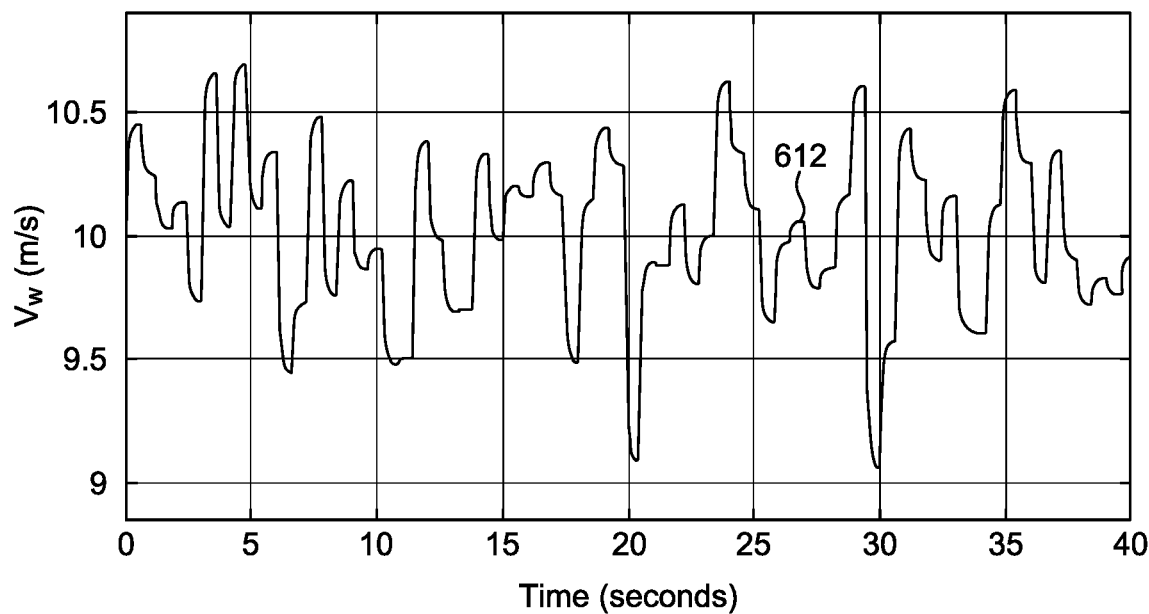
FIG. 6 presents a graphical representation of wind speed (Vw) variations over time, according to certain embodiments.

FIG. 6 presents a graphical representation of wind speed (Vw) variations over time, in accordance with one embodiment. The variations are pertinent to the operation of the wind energy generation unit (114) within the hybrid renewable microgrid system (102). The plot displays the wind speed in meters per second (m/s) on the y-axis against time in seconds on the x-axis. The graph 602 illustrates the fluctuating nature of wind speed, with its value oscillating over time, which reflects the real-world conditions that a wind turbine would experience.

Figure 7:
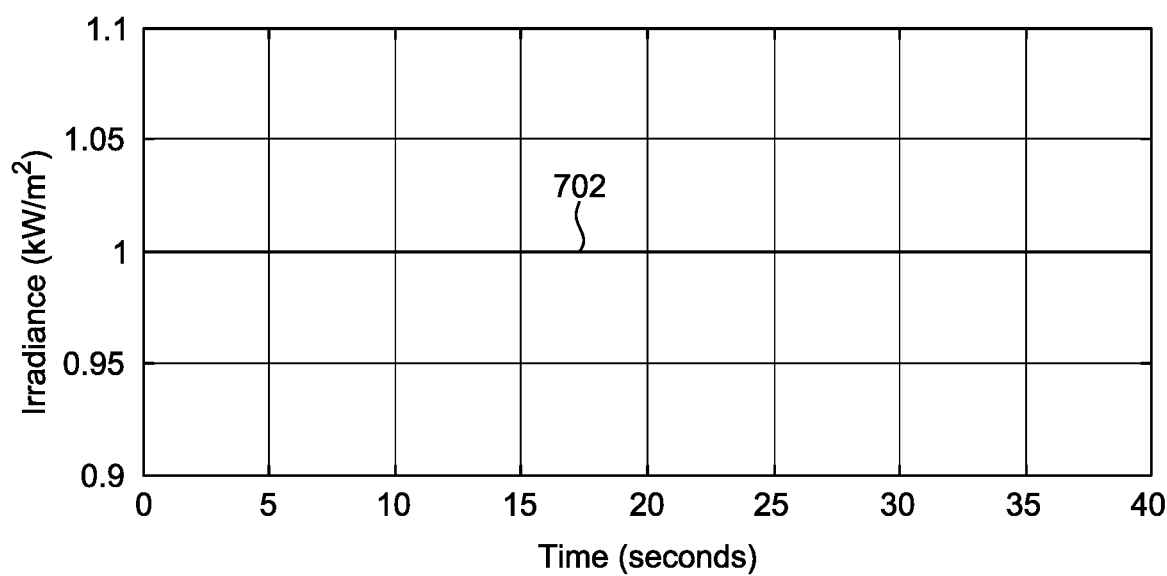
FIG. 7 presents a graphical representation of solar irradiance over time within the hybrid renewable microgrid system, according to certain embodiments.

FIG. 7 presents a graphical representation of solar irradiance over time within the hybrid renewable microgrid system, in accordance with one embodiment. The irradiance is measured in kilowatts per square meter (kW/m²) and is shown on the y-axis, while the x-axis represents time in seconds.

The plot illustrates a constant solar irradiance level of 1 kW/m², which is a standard value used for testing solar panels under ideal conditions. The graph 702 indicates stable solar conditions, without the fluctuations typically seen in real-world scenarios.

Figure 8:
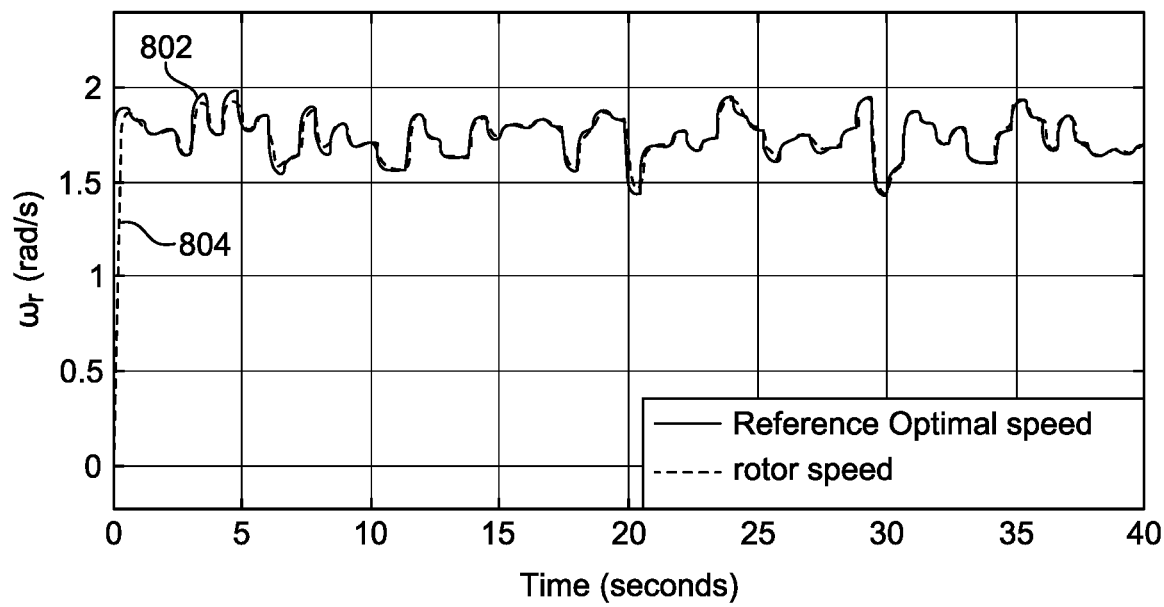
FIG. 8 depicts a graphical presentation of the performance of a control system in tracking the optimal rotor speed ($\omega_r$) of a permanent magnet synchronous generator (PMSG) within the hybrid renewable microgrid system, according to certain embodiments.

FIG. 8 depicts a graphical presentation of the performance of a control system in tracking the optimal rotor speed ($\omega_r$) of a permanent magnet synchronous generator (PMSG) within the hybrid renewable microgrid system (102), in accordance with one embodiment. The graph plots the rotor speed in radians per second (rad/s) on the y-axis against time in seconds on the x-axis.

Curve 802 represents the optimal rotor speed reference calculated by the MPPT algorithm, and curve 804 depicts the actual rotor speed achieved by the PMSG. The close alignment of the actual rotor speed curve with the reference curve demonstrates the efficacy of the controller in following the optimal speed setpoint.

Figure 9:
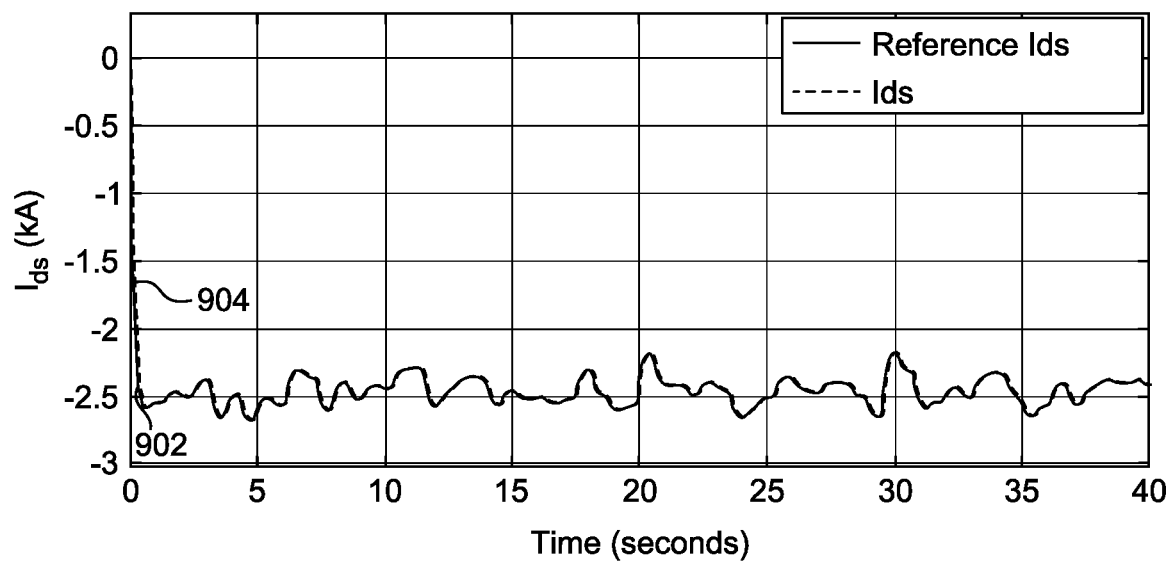
FIG. 9 illustrates the performance of the d-axis stator current (Ids) in a hybrid renewable microgrid system, according to certain embodiments.

FIG. 9 illustrates the performance of the d-axis stator current ($I_{ds}$) in a hybrid renewable microgrid system (102) as it pertains to maintaining unity power factor operation. The graph plots the actual stator current, represented by curve 904, against a reference stator current, represented by curve 902, over time in seconds. The graph shows that the actual current closely follows the reference, indicating effective control for unity power factor, which is essential for optimal energy transfer within the system.

Figure 10:
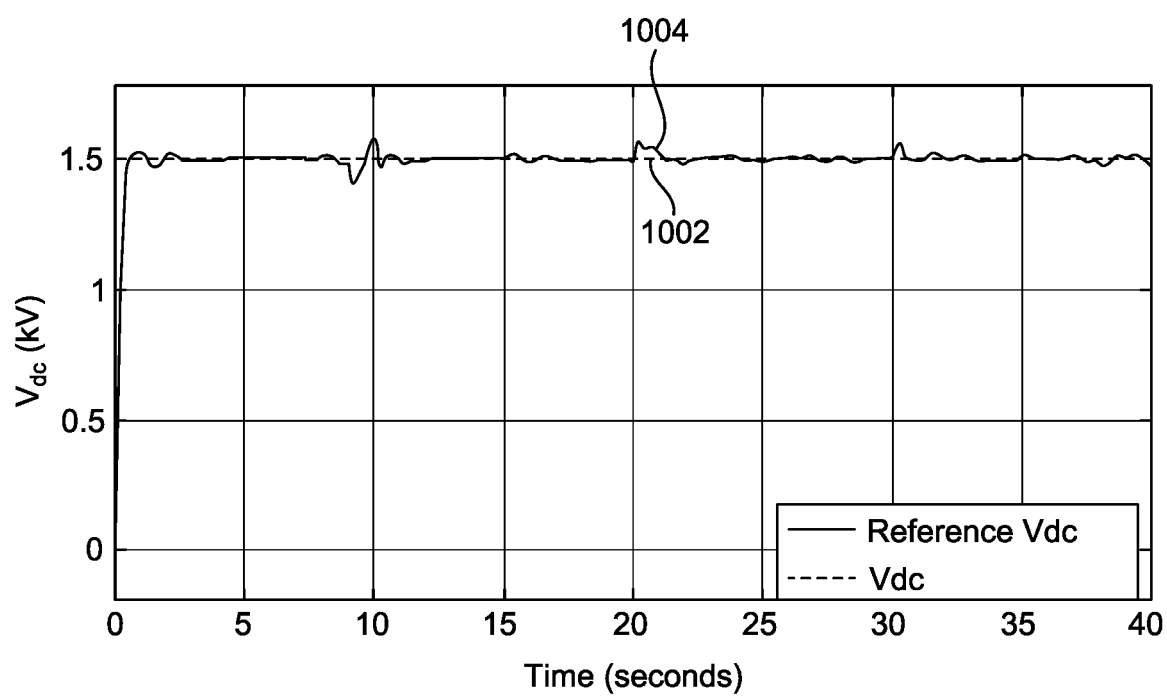
FIG. 10 displays the voltage level of the DC bus (Vdc) in the same hybrid renewable microgrid system, according to certain embodiments.
Figure 11A:
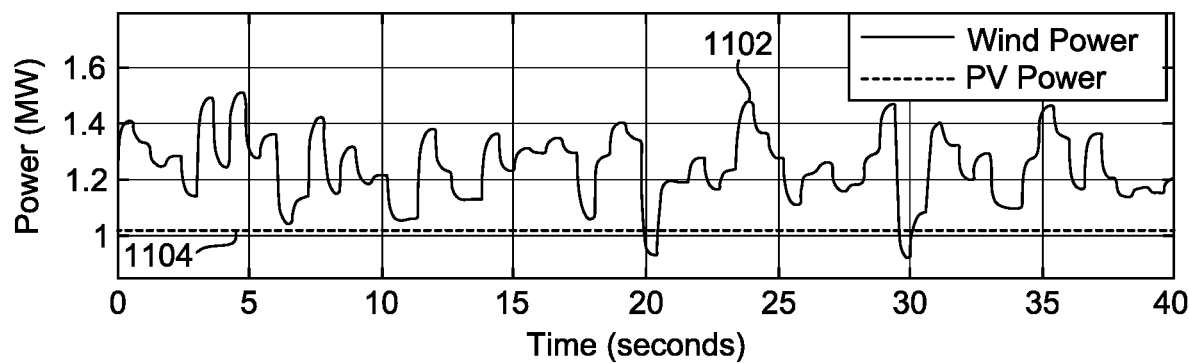
FIGS. 11A-D provide a set of graphs related to the power management within a hybrid renewable microgrid system, according to certain embodiments.
Figure 11B:
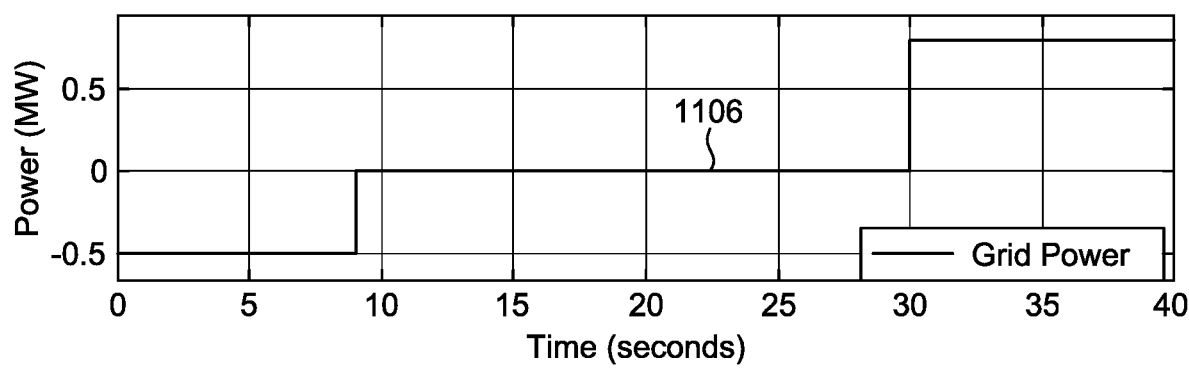
Figure 11C:
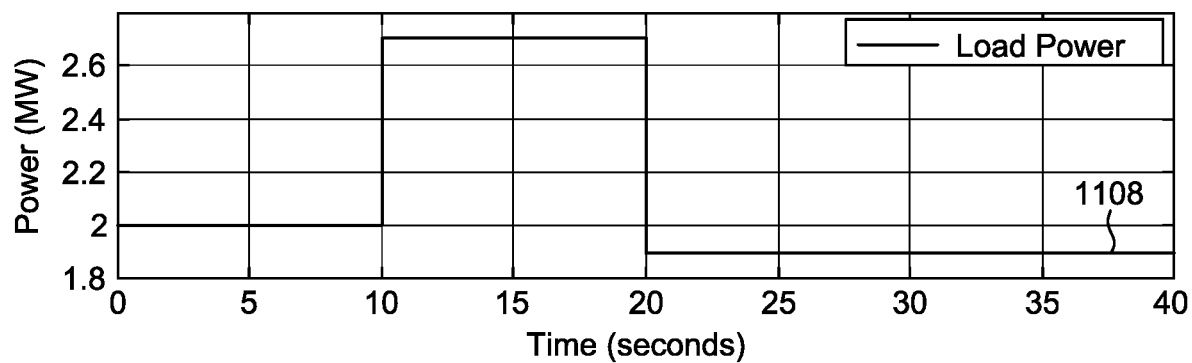
Figure 11D:
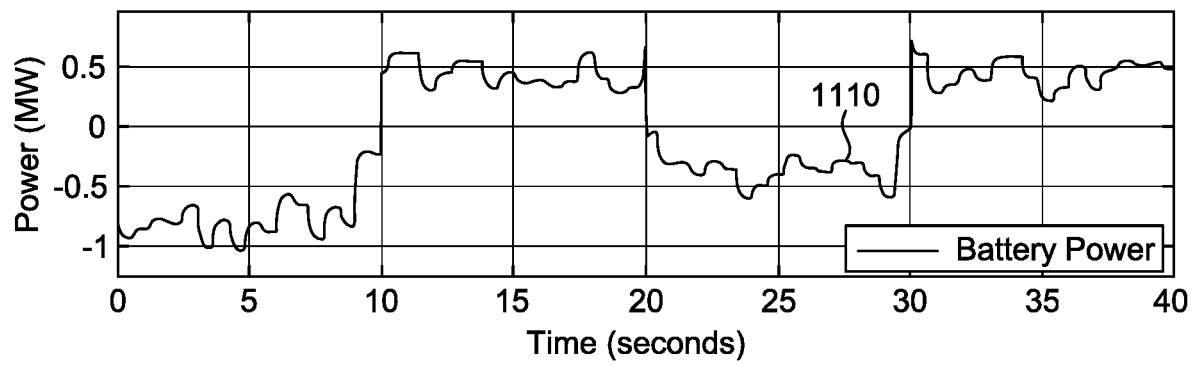

FIG. 10 displays the voltage level of the DC bus ($V_{dc}$) in the same hybrid renewable microgrid system (102), charting both the actual voltage and the reference voltage over time in seconds. The reference voltage, represented by curve 1002, corresponds to the maximum power point tracking (MPPT) voltage of the solar photovoltaic (PV) system. The graph demonstrates that the actual DC bus voltage, represented by curve 1004, remains consistent with the reference, suggesting stable operation and effective integration of power contributions from the solar PV, wind power generator, and the energy storage system (ESS).

FIG. 11 provides a set of graphs related to the power management within a hybrid renewable microgrid system (102), in accordance with one embodiment. The graphs illustrate power produced and consumed over time in megawatts (MW) on the y-axis against time in seconds on the x-axis.

The first graph shows the wind and photovoltaic (PV) power generation, with the wind power indicated by curve 1102 and the PV power indicated by curve 1104, representing specific moments of power generation fluctuation.

The second graph depicts the grid power exchange, where the grid supplies power to the microgrid system at times indicated by curve 1106 and receives power from the microgrid at other intervals.

The third graph shows the load power demand within the microgrid, with a significant increase and decrease, represented by curve 1108, reflecting a dynamic change in the power requirement.

The fourth graph tracks the battery power, highlighting periods of charging and discharging, represented by curve 1110, in response to the variations in generation and load demand.

Figure 12A:
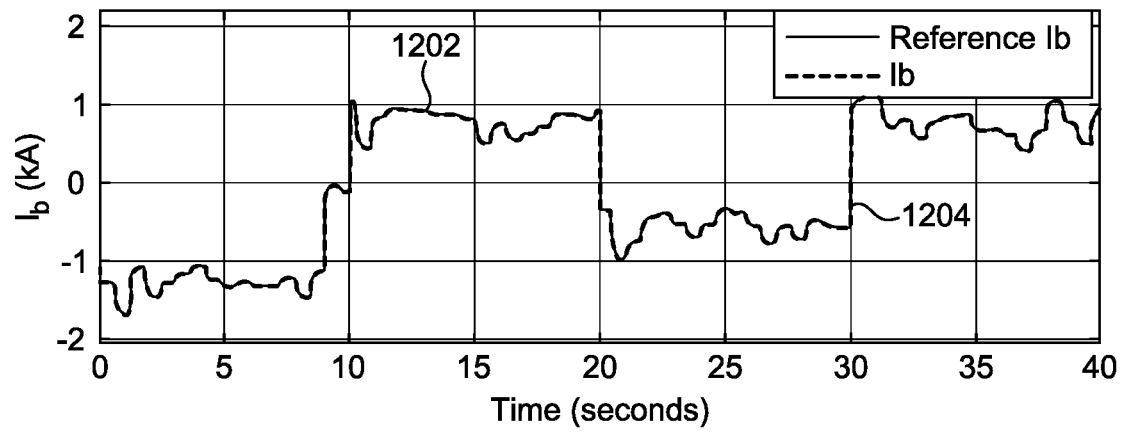
FIGS. 12A-B provide a visual representation of the battery charging and discharging activities within the hybrid renewable microgrid system, according to certain embodiments.
Figure 12B:
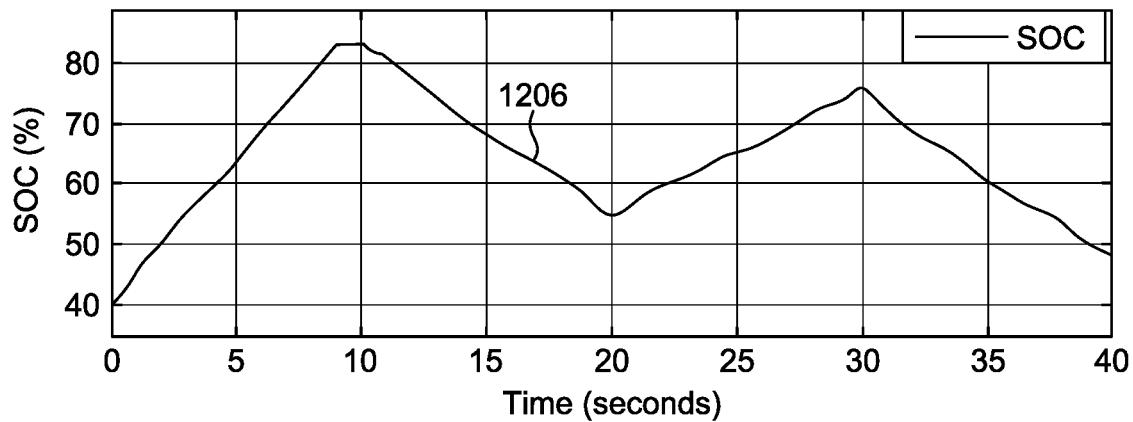

FIG. 12 provides a visual representation of the battery charging and discharging activities within the hybrid renewable microgrid system (102), aligned with the power balancing requirements. The graph plots the battery current ($I_b$) in kiloamperes (kA) on the y-axis against time in seconds on the x-axis. Curve 1202 depicts the reference current for the battery, while curve 1204 depicts the actual current flowing into or out of the battery.

Figure 13:
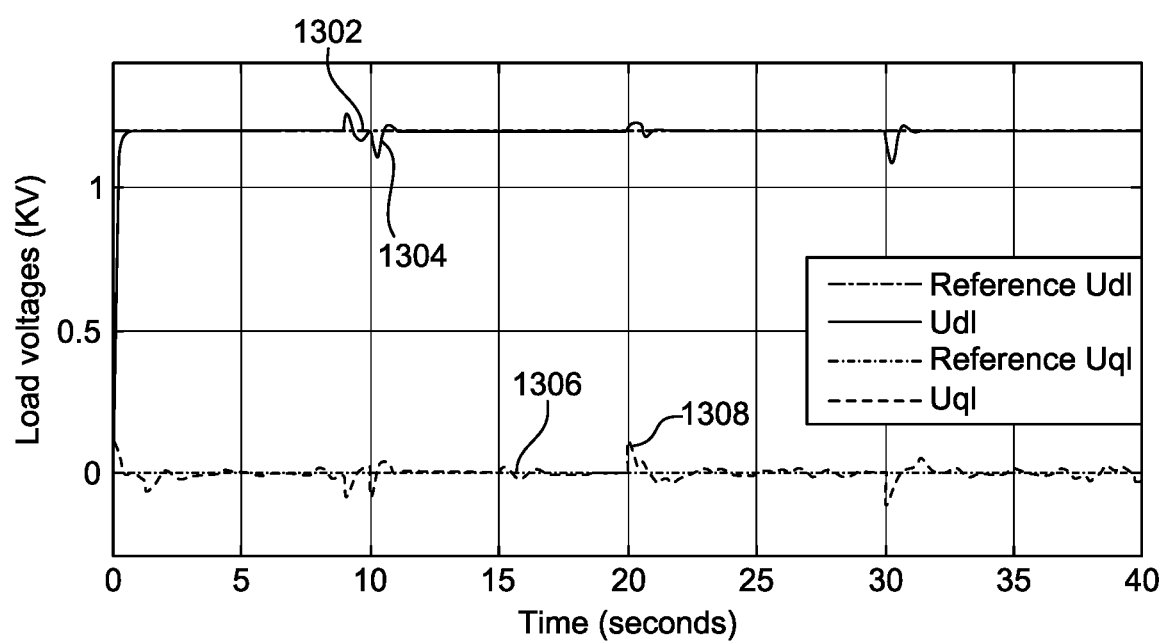
FIG. 13 illustrates the voltage regulation capability of the hybrid renewable microgrid system, according to certain embodiments.

FIG. 13 illustrates the voltage regulation capability of the hybrid renewable microgrid system (102) in response to dynamic load demands. The graph displays load voltage in kilovolts (kV) on the y-axis over time in seconds on the x-axis. The reference direct-axis voltage (Udi-1302) and the actual direct-axis voltage ($U_{dl}$-1304) are depicted, along with the reference quadrature-axis voltage ($U_{qf}$-1306) and the actual quadrature-axis voltage ($U_{qf}$-1308). The graph shows the system's ability to maintain load voltage despite variations in demand and during transitions between islanded and grid-connected modes, highlighting the effectiveness of the controller in sustaining power quality.

Figure 14:
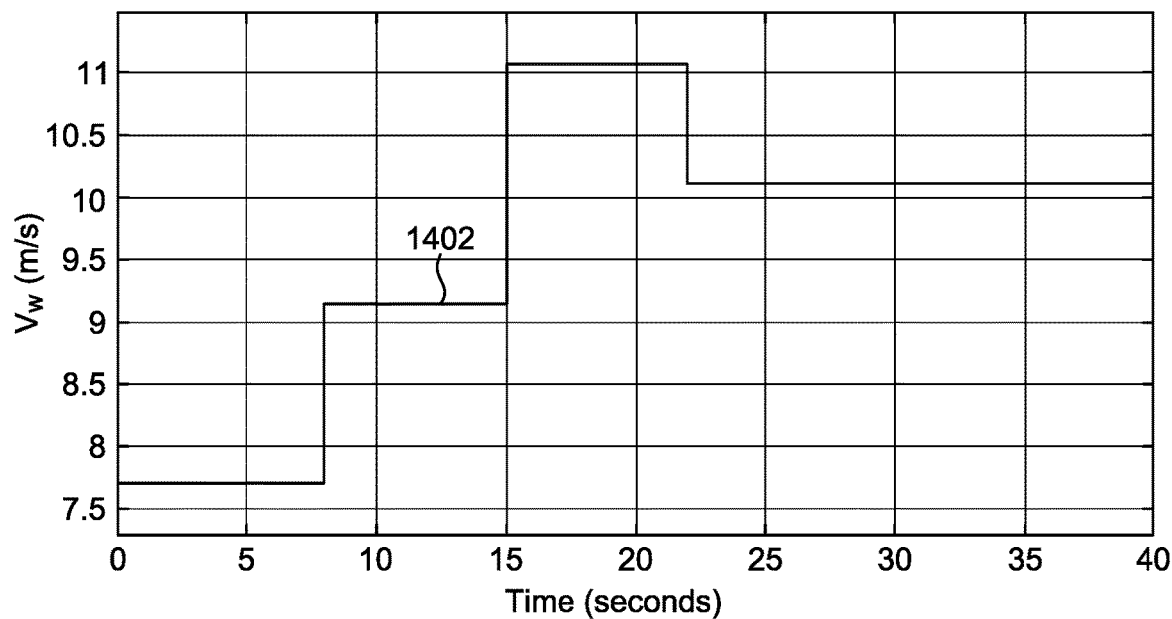
FIG. 14 shows a step-changing wind speed profile within the hybrid renewable microgrid system, according to certain embodiments.

FIG. 14 shows a step-changing wind speed profile within the hybrid renewable microgrid system (102). The graph indicates wind speed in meters per second (m/s) on the y-axis against time in seconds on the x-axis. Curve 1402 indicates the varying wind speeds at various times, which the system's control algorithm accommodates to ensure optimal power generation from the wind energy unit.

Figure 15:
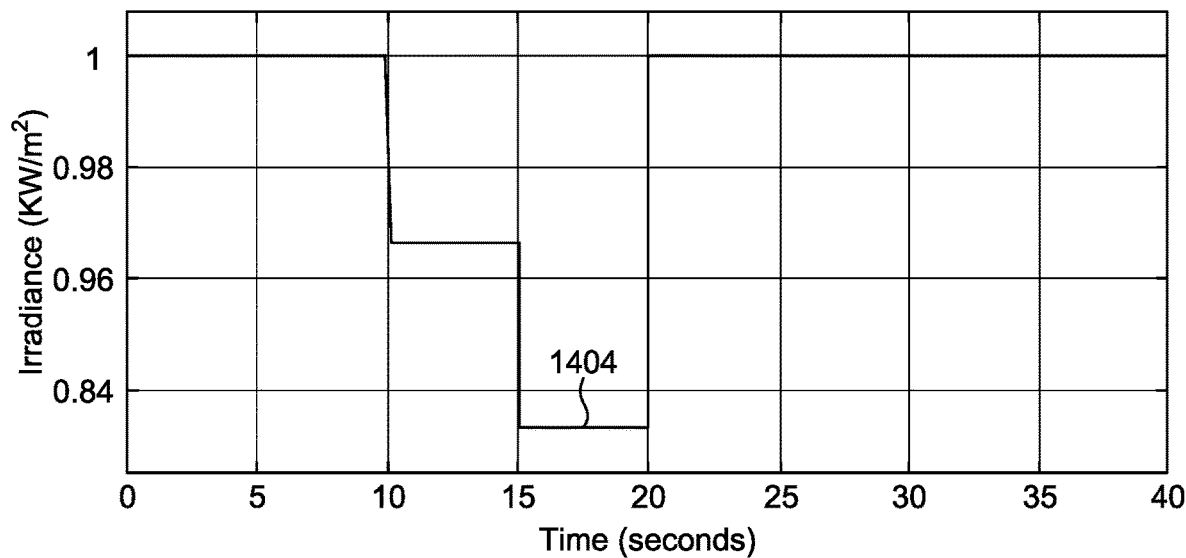
FIG. 15 illustrates changes in solar irradiance over time, according to certain embodiments.

FIG. 15 illustrates changes in solar irradiance over time, displayed in kilowatts per square meter (kW/m²) on the y-axis, with time in seconds on the x-axis. Curve 1502 depicts the decrease and subsequent increase in irradiance levels, demonstrating the solar energy unit's response to these changes, again optimized through the control system to maintain efficient power production.

Figure 16:
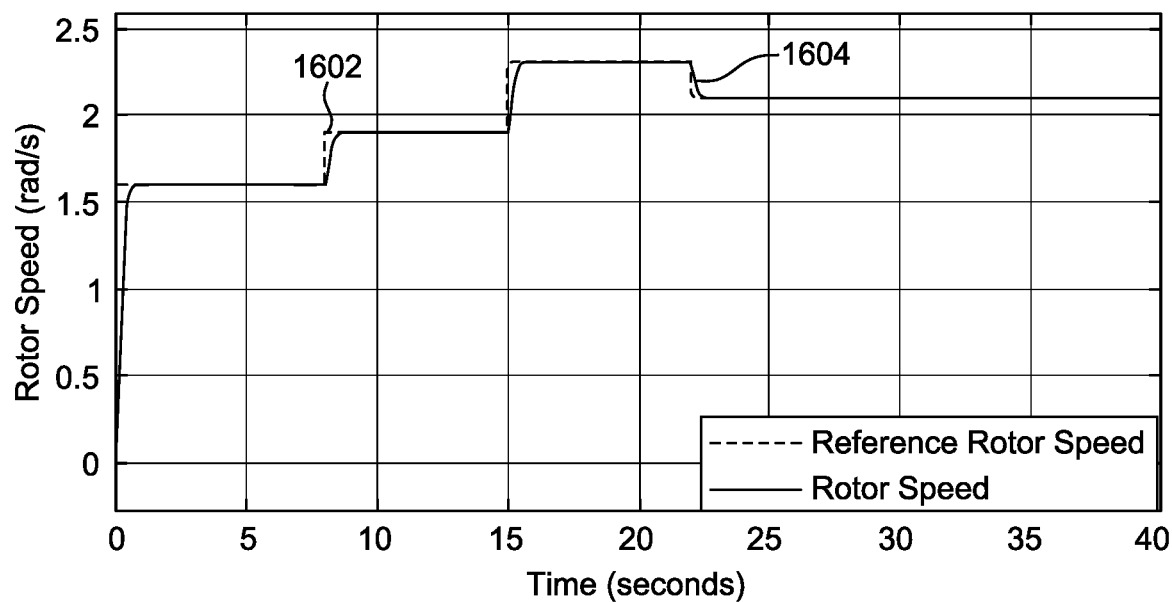
FIG. 16 represents the rotor speed of the PMSG in the system, according to certain embodiments.

FIG. 16 represents the rotor speed of the PMSG in the system, plotted in radians per second (rad/s) on the y-axis versus time on the x-axis. The graph compares the reference rotor speed indicated by curve 1602 to the actual speed indicated by curve 1604, proving the control system's effectiveness in adjusting the PMSG's speed to match the optimal speed for varying wind conditions.

Figure 17:
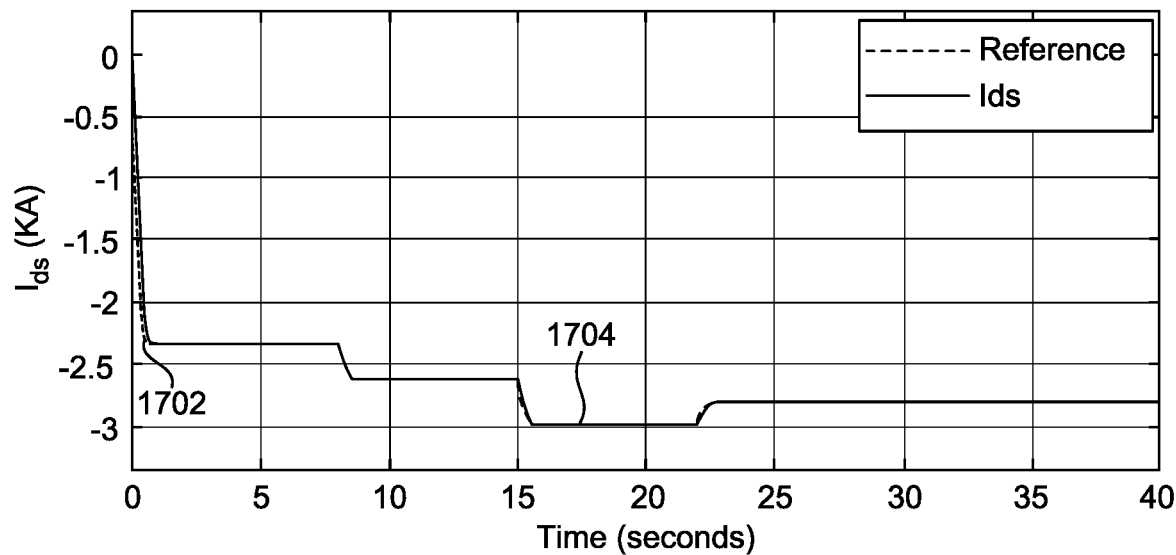
FIG. 17 presents the tracking of the d-axis stator current (Ids), according to certain embodiments.

FIG. 17 presents the tracking of the d-axis stator current ($I_{ds}$), with the current in kiloamperes (kA) on the y-axis against time on the x-axis. The graph compares the reference current indicated by curve 1702 to the actual current indicated by curve 1704, proving precise control to maintain the unity power factor during power transfer from the wind energy generation unit.

Figure 18:
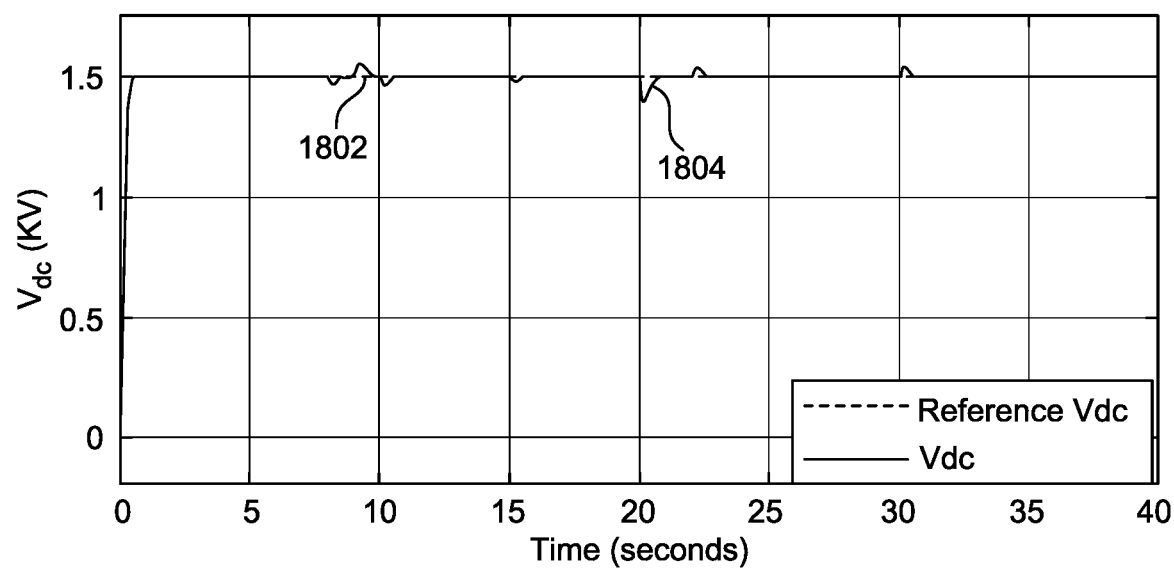
FIG. 18 illustrates the regulation of the DC-bus voltage within the hybrid renewable microgrid system, according to certain embodiments.
Figure 19A:
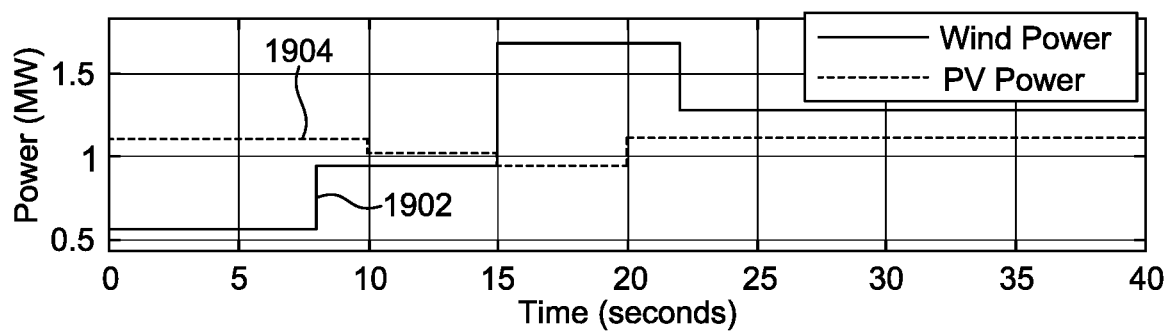
FIGS. 19A-D present multiple power profiles of the hybrid renewable microgrid system, according to certain embodiments.
Figure 19B:
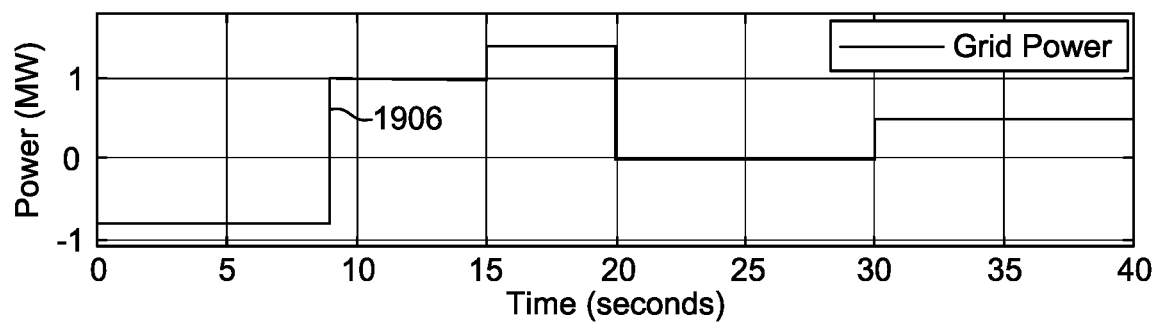
Figure 19C:
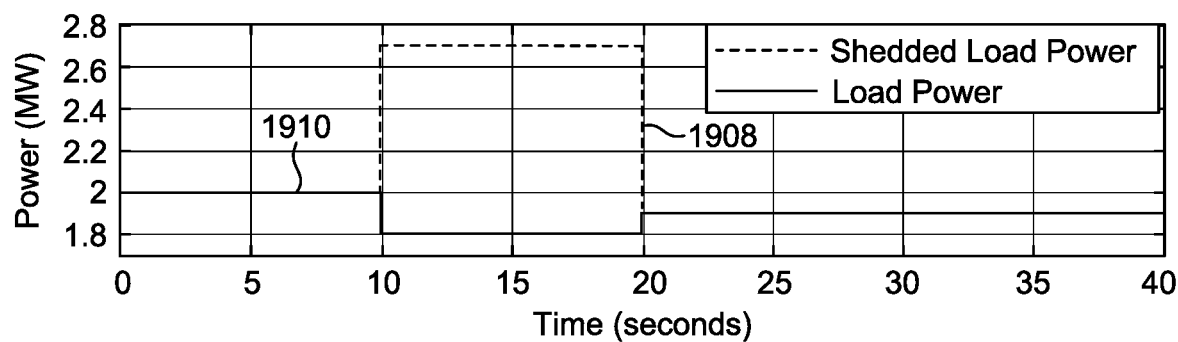
Figure 19D:
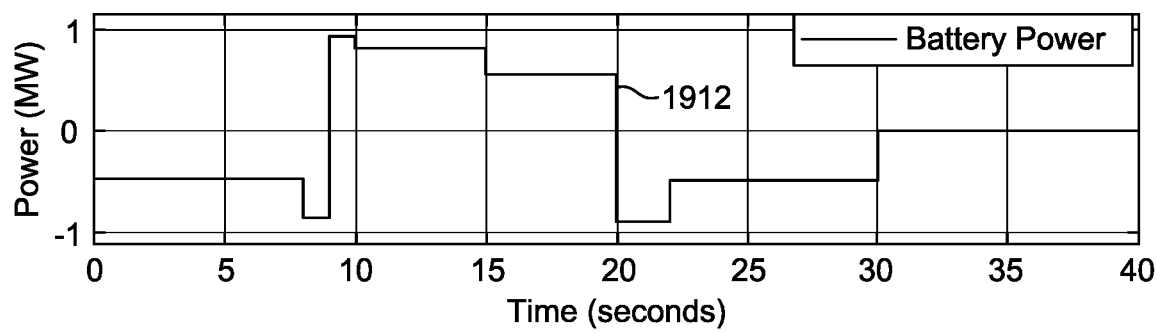

FIG. 18 illustrates the regulation of the DC-bus voltage within the hybrid renewable microgrid system (102). The graph plots the DC-bus voltage (l'ac) in kilovolts (kV) on the y-axis against time in seconds on the x-axis. Curve 1802 shows the reference DC-bus voltage, and curve 1804 represents the actual voltage maintained across the DC bus. Despite variations in PV power due to changing irradiance levels, the controller ensures that the actual DC-bus voltage closely matches the reference, demonstrating the system's ability to maintain a stable voltage during varying conditions.

FIG. 19 presents multiple power profiles of the hybrid renewable microgrid system (102), displayed in megawatts (MW) on the y-axis over time in seconds on the x-axis. Wind power (1902) and PV power (1904) curves show the generation from renewable sources. The grid power curve (1906) indicates the power exchanged with the utility grid, transitioning between receiving and supplying power. The load power curve (1910) and the shedded load power curve (1908) depict the system's load demand, with adjustments made to maintain balance. The battery power curve (1912) reflects the charging and discharging activities of the battery storage, which compensates for the difference between generation and load demand.

Figure 20A:
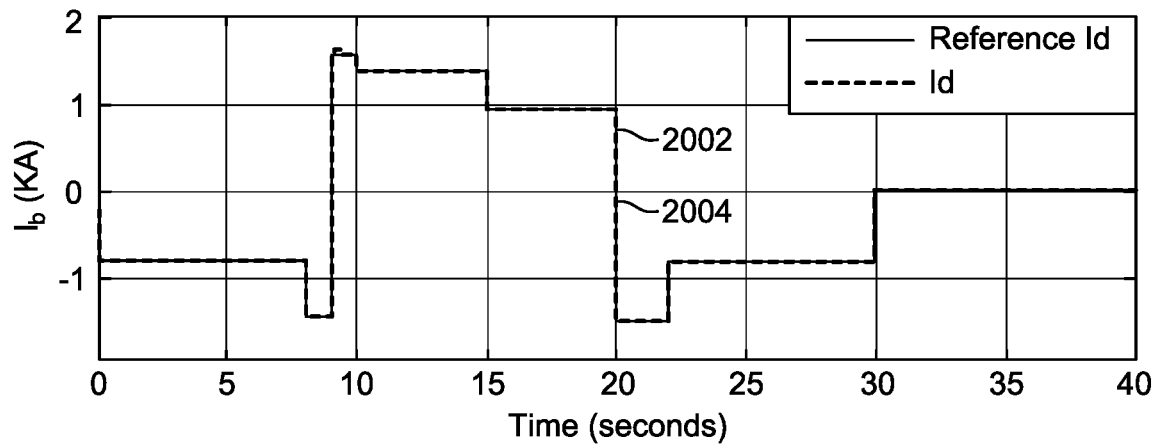
FIGS. 20A-B illustrates the battery current management in the hybrid renewable microgrid system, according to certain embodiments.
Figure 20B:
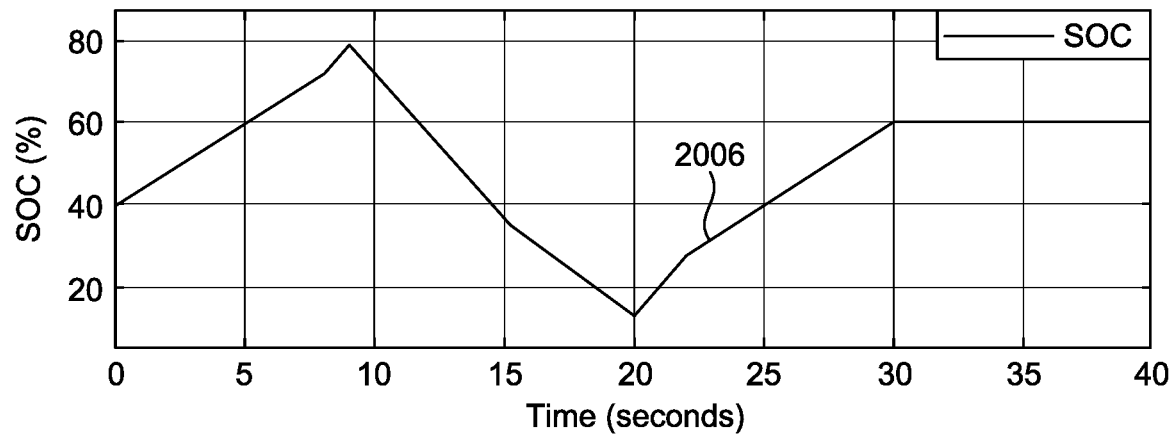

FIG. 20 illustrates the battery current management in the hybrid renewable microgrid system (102). The top graph shows the battery current ($I_b$) in kiloamperes (kA) on the y-axis, with the x-axis representing time in seconds. Curve 2002 indicates the reference current required for charging or discharging the battery, and curve 2004 shows the actual current. The graph signifies the system's ability to effectively match the battery's operation to the power demand, ensuring energy balance within the microgrid.

The bottom graph of FIG. 20 displays the State of Charge (SoC) of the battery, plotted as a percentage on the y-axis over time on the x-axis. Curve 2006 shows that the SoC remains steady at 60% between 30 to 40 seconds, reflecting the period when no power is being transferred to or from the battery.

Figure 21:
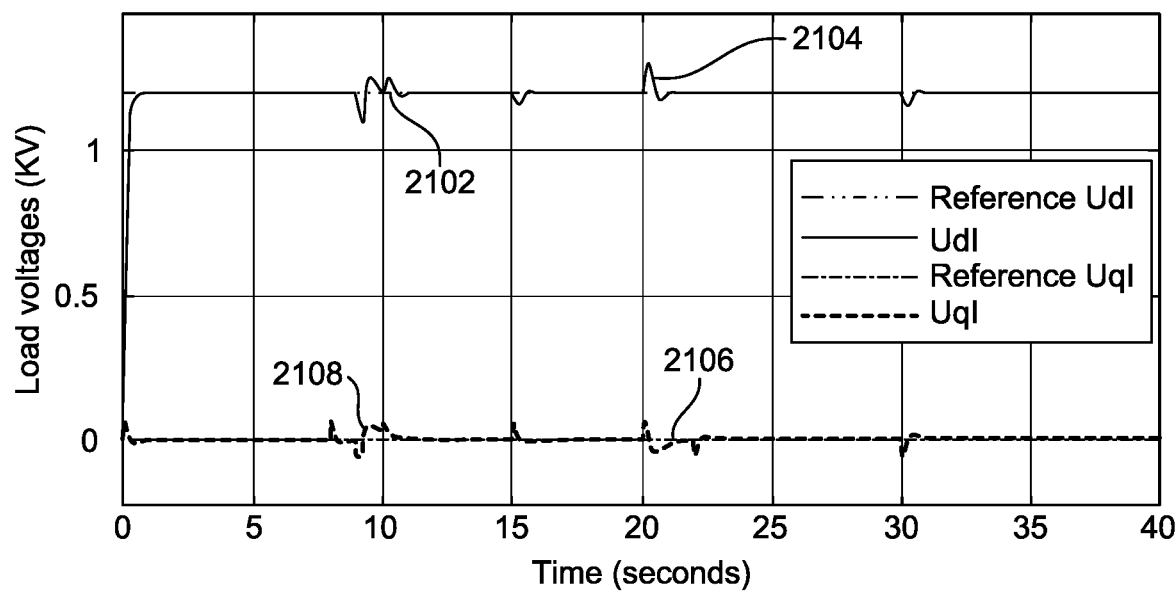
FIG. 21 presents the voltage regulation in the hybrid renewable microgrid system, according to certain embodiments.

FIG. 21 presents the voltage regulation in the hybrid renewable microgrid system (102). The graph indicates the load voltage in kilovolts (kV) on the y-axis and time in seconds on the x-axis. Curve 2102 represents the reference direct-axis voltage ($U_{dl}$), and curve 2104 is the actual direct-axis voltage. Similarly, curve 2106 is the reference quadrature-axis voltage ($U_{ql}$), with curve 2108 showing the actual quadrature-axis voltage. The consistent load voltage and convergence of $U_{ql}$ towards zero demonstrate the controller's proficiency in maintaining voltage stability and minimizing reactive power, despite transitions in grid mode and load variations. Numerous modifications and variations of the present disclosure are possible in light of the above teachings. It is therefore to be understood that within the scope of the appended claims, the invention may be practiced otherwise than as specifically described herein.

The invention claimed is:

1. A method to control a hybrid renewable microgrid system,
   wherein the hybrid renewable microgrid system comprises a solar energy generation unit and an energy storage unit in direct connection to a DC bus, a DC-DC buck-boost converter connected to the energy storage unit, a wind energy generation unit coupled to a rotor-side converter, a grid-side converter coupled to the DC bus, and a microgrid load; and
   wherein a utility grid comprising a plurality of energy generation sources and one or more utility grid loads is electrically coupled to the hybrid renewable microgrid system;

the method comprising:
   performing a maximum power point tracking control for each of the solar energy generation unit and the wind energy generation unit;
   receiving a power from the wind energy generation unit utilizing the rotor-side converter and receiving a power from the solar energy generation unit utilizing the grid-side converter;
   supplying at least one of (1) a first power to the microgrid load of the hybrid renewable microgrid system in a standalone operation of the hybrid renewable microgrid system and (2) a second power to a combination of the microgrid load of the hybrid renewable microgrid system and the one or more utility grid loads of the utility grid in a grid-connected operation of the hybrid renewable microgrid system;
   receiving a third power from the plurality of energy generation sources of the utility grid utilizing the rotor-side converter in the grid-connected operation of the hybrid renewable microgrid system;
   performing a sliding mode control for at least one of a transition from the standalone operation to the grid-connected operation and a transition from the grid-connected operation to the standalone operation;
   controlling the supply of the second power in the grid-connected operation by integrating the wind energy generation unit into the utility grid through the rotor-side converter and the grid-side converter;
   regulating a microgrid load voltage of the microgrid load in the grid-connected operation of receiving the third power using a charging and/or discharging of the energy storage unit;
   controlling the charging and/or discharging of the energy storage unit using the DC-DC buck-boost converter in the standalone operation and the grid-connected operation of the hybrid renewable microgrid system; and
   regulating the microgrid load voltage through performing the maximum power point tracking control, the sliding mode control, and the charging and discharging of the energy storage unit in the standalone operation and the grid-connected operation of the hybrid renewable microgrid system.

2. The method of claim 1, comprising charging the energy storage unit using the DC-DC buck-boost converter, wherein at least one of:
   a sum value of power received from the solar energy generation unit and the power received from the wind energy generation unit greater than at least one of the first power and the second power; and
   a sum value of power received from the solar energy generation unit, the power received from the wind energy generation unit, and the power received from the plurality of energy generation sources of the utility grid greater than at least one of the first power and the second power.

3. The method of claim 1, comprising discharging the energy storage unit using the DC-DC buck-boost converter, wherein at least one of
   a sum value of power received from the solar energy generation unit and the power received from the wind energy generation unit lower than at least one of the first power and the second power; and a sum value of power received from the solar energy generation unit, the power received from the wind energy generation unit, and the power received from the plurality of energy generation sources of the utility grid lower than at least one of the first power and the second power.

4. The method of claim 1, further comprising
converting an AC signal output of the wind energy generation unit to a DC signal using the rotor-side converter.

5. The method of claim 1, further comprising
converting a plurality of DC signal outputs from the DC bus to a plurality of three-phase AC signals for supplying at least one of the first power and the second power using the grid-side converter.

6. The method of claim 1, further comprising
converting a plurality of AC signals of the third power to a plurality of DC signals using the grid-side converter.

7. The method of claim 1, further comprising
utilizing a diode connected in series and downstream to the solar energy generation unit for absorbing a reverse current from the DC bus.

8. The method of claim 1, further comprising
stabilizing a DC voltage of the DC-bus through performing the maximum power point tracking control, the sliding mode control, and the charging and discharging of the energy storage unit.

9. The method of claim 1, further comprising
triggering the sliding mode control through at least one of an ON state and an OFF state of a switch connected between the microgrid load of the hybrid renewable microgrid system and the utility grid.

10. The method of claim 1, further comprising
connecting the rotor-side converter and the grid-side converter in a back-to-back converter configuration.

11. A power system, comprising:
a hybrid renewable microgrid system, comprising
a multiple-input multiple-output controller, comprising
a rotor-side converter and a grid-side converter arranged in a back-to-back converter configuration; and
a DC-DC buck-boost converter;
a solar energy generation unit including one or more photovoltaic panels connected in series and parallel;
a wind energy generation unit including a wind turbine coupled to a permanent magnet synchronous generator, wherein the permanent magnet synchronous generator is coupled to the rotor-side converter;
a DC bus, wherein the solar energy generation unit is in direct connection to the DC bus, and wherein the DC bus is connected to the grid-side converter;
an energy storage unit integrated to the DC-DC buck-boost converter and connected to the DC bus; and
a microgrid load coupled to the grid-side converter; and
a utility grid, comprising:
a plurality of energy generation sources; and
one or more utility grid loads;
wherein the multiple-input multiple-output controller is configured to perform a maximum power point tracking control to receive power from the solar energy generation unit and the wind energy generation unit;
wherein the multiple-input multiple-output controller is configured to perform a sliding mode control for a transition between a standalone operation and a grid-connected operation of the hybrid renewable microgrid system;
wherein the hybrid renewable microgrid system is electrically disconnected from the utility grid in the standalone operation;
wherein the hybrid renewable microgrid system is configured to perform at least one of supplying a power to the one or more utility loads of the utility grid and receiving a power from the plurality of energy generation sources of the utility grid in the grid-connected operation; and
wherein the multiple-input multiple-output controller is configured to regulate a microgrid load voltage of the microgrid load and a DC voltage of the DC bus.

12. The hybrid renewable microgrid system of claim 11, wherein the DC-DC buck-boost converter is configured to transfer power from the energy storage unit of the hybrid renewable microgrid system, to at least one of the wind energy generation unit, the solar energy generation unit and the utility grid through the discharging of the energy storage unit.

13. The hybrid renewable microgrid system of claim 11, wherein the DC-DC buck-boost converter is configured to transfer power to the energy storage unit of the hybrid renewable microgrid system from at least one of the wind energy generation unit, the solar energy generation unit and the utility grid through the charging of the energy storage unit.

14. The hybrid renewable microgrid system of claim 11, wherein the grid-side converter is configured to interconnect the solar energy generation unit and the wind energy generation unit.

15. The hybrid renewable microgrid system of claim 11, wherein a diode is connected in series to the solar energy generation unit.

16. The hybrid renewable microgrid system of claim 11, wherein the rotor-side converter is configured to convert an AC signal output of the wind energy generation unit to a DC signal.

17. The hybrid renewable microgrid system of claim 11, wherein the grid-side converter is configured to convert at least one of a plurality of DC signals of the DC bus to a plurality of three-phase AC signals and a plurality of three-phase AC signals to a plurality of DC signals.

18. The hybrid renewable microgrid system of claim 11, comprises a switch configured to trigger a transition between a standalone operation and a grid-connected operation of the hybrid renewable microgrid system.

19. The hybrid renewable microgrid system of claim 11, wherein the multiple-input multiple-output controller comprises a process circuitry configured to formulate a maximum power point tracking of the wind energy generation unit and the solar energy generation unit.

20. The hybrid renewable microgrid system of claim 11, wherein the multiple-input multiple-output controller further comprises a pulse width modulation generator configured to generate a plurality of pulse width modulation signals as an input to the grid-side converter.

* * * * *